(12) United States Patent
Hedayat

(10) Patent No.: US 10,181,930 B2
(45) Date of Patent: Jan. 15, 2019

(54) MULTIPLEXING ACKNOWLEDGMENT MESSAGES IN RESPONSE TO DOWNLINK FRAMES

(71) Applicant: NEWRACOM, INC., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 93 days.

(21) Appl. No.: 15/151,433

(22) Filed: May 10, 2016

(65) Prior Publication Data

US 2016/0330714 A1  Nov. 10, 2016

Related U.S. Application Data

(60) Provisional application No. 62/193,305, filed on Jul. 16, 2015, provisional application No. 62/191,623, (Continued)

(51) Int. Cl.
| | |
|---|---|
| *H04L 1/00* | (2006.01) |
| *H04L 5/00* | (2006.01) |
| *H04L 1/16* | (2006.01) |
| *H04W 72/12* | (2009.01) |
| *H04B 7/0452* | (2017.01) |
| *H04W 84/12* | (2009.01) |

(52) U.S. Cl.
CPC ......... *H04L 1/1621* (2013.01); *H04B 7/0452* (2013.01); *H04L 5/0007* (2013.01);
(Continued)

(58) Field of Classification Search
CPC ........... H04B 7/04; H04B 7/0452; H04L 1/16; H04L 5/00; H04L 5/0007; H04L 1/1621;
(Continued)

(56) References Cited

U.S. PATENT DOCUMENTS

2009/0196364 A1* 8/2009 Nakajima ........... H04W 28/065
                                                           375/260
2012/0201213 A1* 8/2012 Banerjea ........... H04W 72/0453
                                                           370/329
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Charles C Jiang
*Assistant Examiner* — Kyaw Z Soe
(74) *Attorney, Agent, or Firm* — Morgan, Lewis & Bockius LLP

(57) ABSTRACT

In an example of multi-user wireless communications, an access point may send a downlink frame to multiple stations. Some or all of the stations may generate and transmit their respective uplink frames. The uplink frames from the stations may be aggregated or multiplexed to form a final uplink frame that is received by the access point. The uplink frames may be block acknowledgment or acknowledgment (BA or ACK) frames. Uplink response scheduling may be located in a payload of the downlink frame, in which the uplink response scheduling indicates one or more resource units assigned to the multiple stations for transmitting the uplink frames. In some examples, the uplink response scheduling is in a control field of the payload, in a trigger frame as part of the payload. In some aspects, the downlink frame is part of a multicast transmission. Other methods, apparatus, and computer-readable media are also disclosed.

18 Claims, 18 Drawing Sheets

Related U.S. Application Data filed on Jul. 13, 2015, provisional application No. 62/160,527, filed on May 12, 2015, provisional application No. 62/159,346, filed on May 10, 2015.

(52) U.S. Cl.
CPC . *H04W 72/1289* (2013.01); *H04L 2001/0093* (2013.01); *H04W 72/1268* (2013.01); *H04W 84/12* (2013.01)

(58) Field of Classification Search
CPC .......... H04L 2001/0093; H04W 72/12; H04W 72/1289; H04W 84/12; H04W 72/1268
See application file for complete search history.

(56) References Cited

U.S. PATENT DOCUMENTS

2016/0014804 A1* 1/2016 Merlin ................. H04L 5/0044
370/329

2016/0226635 A1* 8/2016 Chu ..................... H04L 5/003
2016/0330007 A1* 11/2016 Cherian ................ H04L 5/0055

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

1630

GENERATING A MULTI-USER FRAME FOR DOWNLINK TRANSMISSION DIRECTED TO A PLURALITY OF STATIONS, WHEREIN THE MULTI-USER FRAME INCLUDES A CONTROL FIELD LOCATED IN A PAYLOAD SECTION OF THE MULTI-USER FRAME, WHEREIN THE CONTROL FIELD INDICATES SCHEDULING INFORMATION FOR EACH OF THE PLURALITY OF STATIONS TO TRANSMIT AN UPLINK FRAME AS PART OF A MULTI-USER UPLINK TRANSMISSION WITH THE PLURALITY OF STATIONS

PROVIDING FOR TRANSMISSION THE MULTI-USER FRAME

FIG. 16C

MULTIPLEXING ACKNOWLEDGMENT MESSAGES IN RESPONSE TO DOWNLINK FRAMES

CROSS-REFERENCE TO RELATED APPLICATIONS

This application claims the benefit of priority from U.S. Provisional Application No. 62/159,346, entitled "MULTIPLEXING ACKNOWLEDGMENT MESSAGES IN OFDMA," filed May 10, 2015, U.S. Provisional Application No. 62/160,527, entitled "MULTIUSER ACKNOWLEDGMENT MULTIPLEXING," filed May 12, 2015, U.S. Provisional Application No. 62/191,623, entitled "MULTIPLEXING ACKNOWLEDGMENT MESSAGES IN RESPONSE TO DL FRAMES," filed Jul. 13, 2015, and U.S. Provisional Application No. 62/193,305, entitled "MULTIPLEXING ACKNOWLEDGMENT MESSAGES IN RESPONSE TO DL FRAMES," filed Jul. 16, 2015, the entirety of each of which is incorporated herein by reference.

TECHNICAL FIELD

The present description relates in general to wireless communication systems and methods, and more particularly to, for example, without limitation, multiplexing acknowledgment messages in response to downlink (DL) frames.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section may not be assumed to be prior art merely because it is mentioned in or associated with the background section. The background section may include information that describes one or more aspects of the subject technology.

BRIEF DESCRIPTION OF THE DRAWINGS

FIGS. 16A through 16C illustrate flow charts of examples of multi-user aggregation methods for data and control frame operation.

Figure 1:
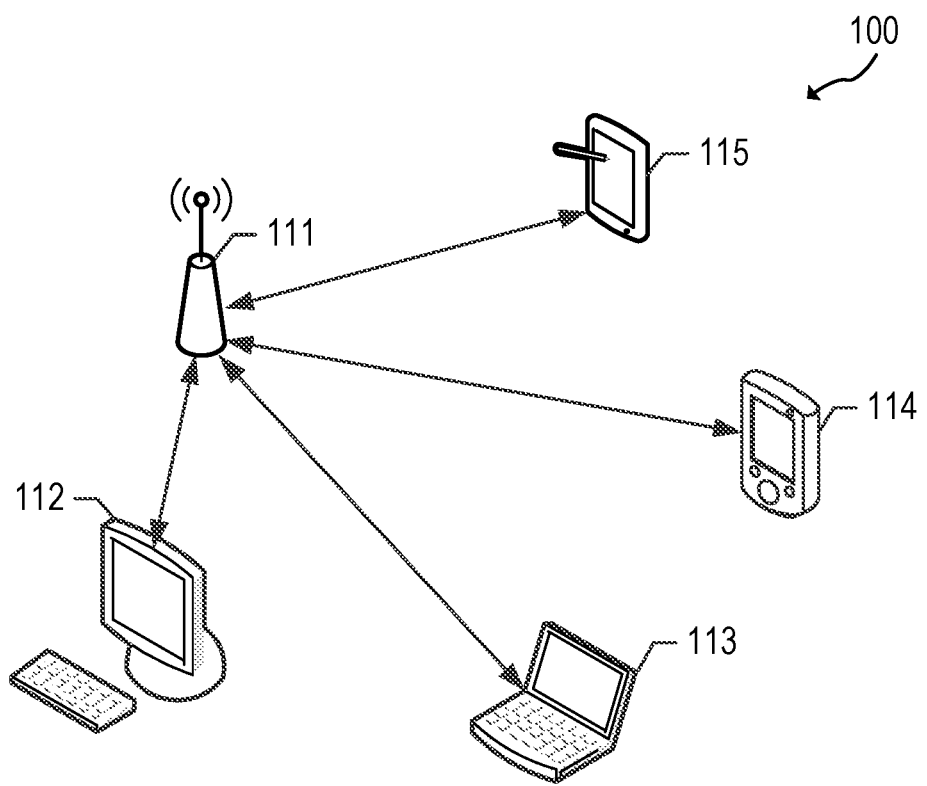
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art can realize, the described implementations may be modified in various different ways, all without departing from the scope of the present disclosure. Accordingly, the drawings and description are to be regarded as illustrative in nature and not restrictive.

New multi-user (MU) transmissions, such as downlink (DL) orthogonal frequency division multiple access (OFDMA) and DL MU multiple-input/multiple-output (MIMO), provide new opportunities for next-generation WiFi technology. For example, OFDMA is a technique that can be used in WiFi technology in order to enhance the aggregation of multiple payloads that are destined to multiple stations (STAs) within the same frame. Due to this and other advantages, OFDMA technique is being considered for next generation WLAN technologies, including 802.11ax which is also referred to as high efficiency (HE) technology.

With OFDMA technique, there comes new opportunities and challenges that can be considered in the design of OFDMA signaling and procedures. Among the opportunities that are provided by OFDMA is the frequency selectivity gain, where AP can allocate resources to each STA where those allocated resources offer highest frequency-gain for that STA. Using acknowledgement procedures, the access point (AP) can obtain the information that is needed to harvest frequency selectivity gain for each STA in the subsequent DL or uplink (UL) OFDMA frames.

The present disclosure describes methods that can be used among multiple nodes (e.g., between a pair of 802.11 nodes) while they exchange frames in OFDMA or MU MIMO formats. In OFDMA or other MU transmissions, the transmitter node, commonly an AP in 802.11 use cases, may send an OFDMA frame to several other STAs (or clients). In response, some or all of the STAs may send acknowledgment frames in form of an Acknowledgment (ACK) frame or a Block Acknowledgment (BlockAck or BA) frame. One or more implementations of the present disclosure describe anew uplink frame with specific formats where multiple STAs (or clients) participate in forming the uplink frame by embedding or multiplexing the STAs' ACK or BA frames into the uplink frame. Hence, several ACK or BA frames may be embedded into a single MU ACK/BA frame, thereby enhancing the OFDMA operation or the MU operation using MU MIMO techniques. One or more implementations of setting the parameters for the MU ACK/BA frame are described herein.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
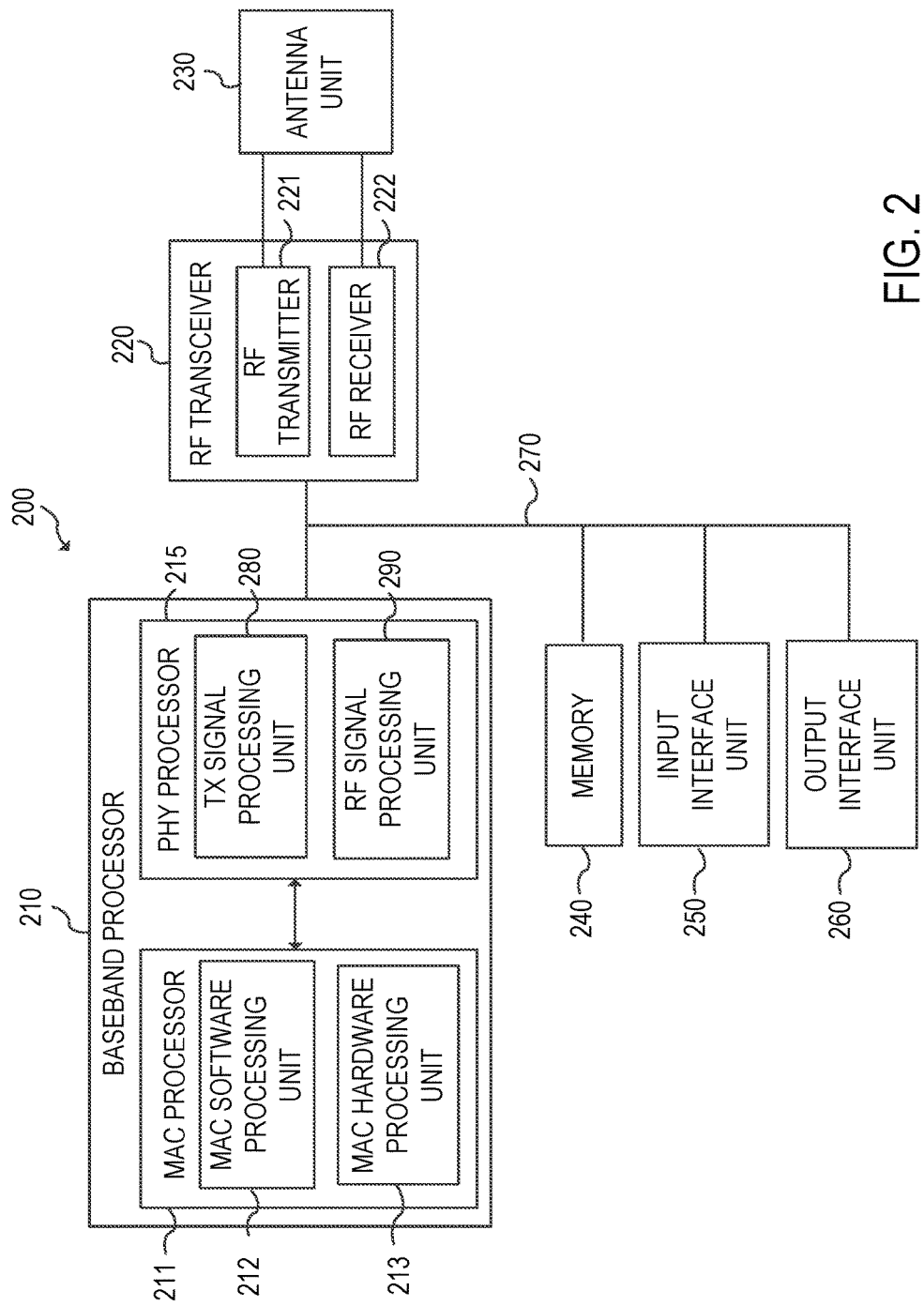
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software such as MAC software including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PITY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be anon-volatile memory unit that stores instructions even when the wireless communication device 200 is off. The ROM, registers and the permanent storage device may be part of the baseband processor 210 or be apart of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art can recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figures 3A, 3B:
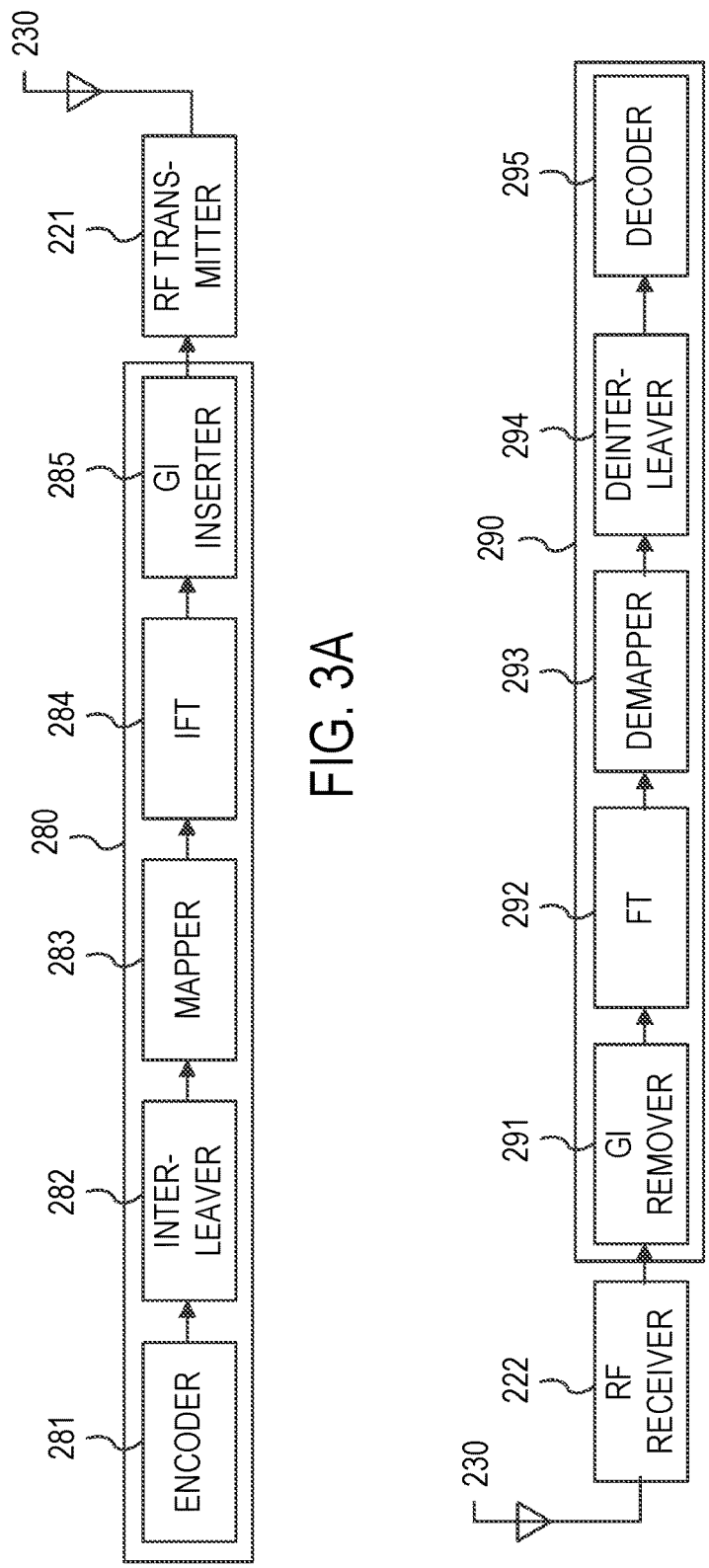
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
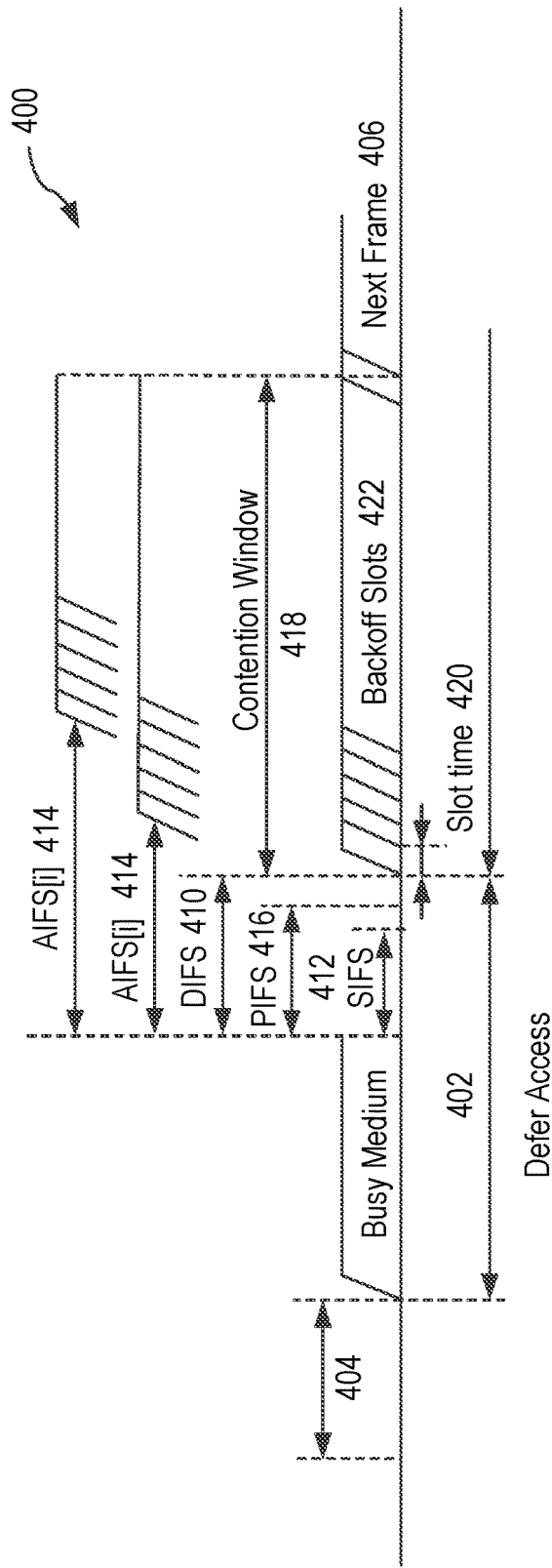
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
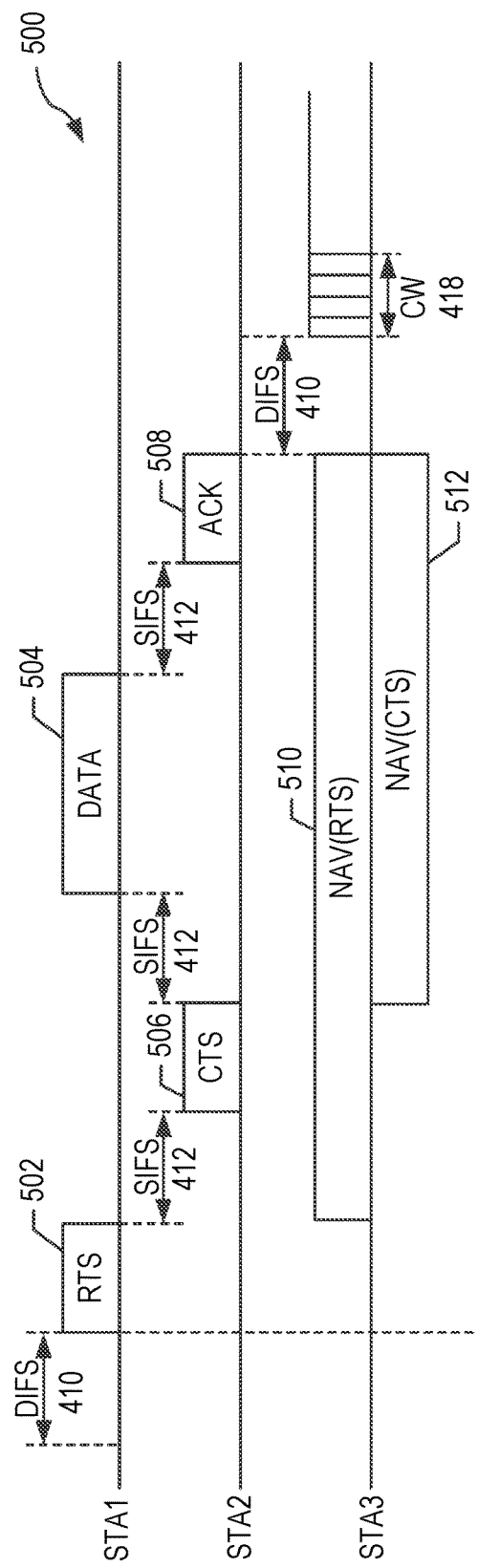
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff. Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Note that an ACK frame is sent to acknowledge the successful reception of a frame by a recipient (e.g., STA2). In one or more implementations, a recipient (e.g., STA2) sends a frame referred to as a block acknowledgment (Block Ack, BlockAck or BA) to acknowledge the successful reception of multiple consecutive frames at once. In this example, a Block Ack mechanism improves channel efficiency by aggregating several acknowledgments into one frame. There are two types of Block Ack mechanisms: immediate and delayed. Immediate Block Ack is suitable for high-bandwidth, low-latency traffic while the delayed Block Ack is suitable for applications that tolerate moderate latency. In FIG. 5, the STA with data to send using the Block Ack mechanism is referred to as the originator, and the receiver of that data as the recipient.

The Block Ack mechanism is initialized by an exchange of add block acknowledgment (ADDBA) Request/Response frames. After initialization, blocks of quality-of-service (QoS) data frames may be transmitted from the originator (e.g., a STA such as an AP) to the recipient (e.g., a STA). A block may be initiated within a polled transmission opportunity (TXOP) or by winning an enhanced distributed channel access (EDCA) contention. The number of frames in the block may be limited, and the amount of state that is to be kept by the recipient may be bounded. The MPDUs within the block of frames are acknowledged by a BlockAck frame, which is requested by a BlockAckReq frame. The Block Ack mechanism does not require the setting up of a traffic stream (TS); however, QoS STAs using the TS facility may select to signal their intention to use the Block Ack mechanism for the scheduler's consideration in assigning TXOPs. Acknowledgments of frames belonging to the same traffic identifier (TID), but transmitted during multiple TXOPs, may also be combined into a single BlockAck frame. The Block Ack mechanism allows the originator to have flexibility regarding the transmission of data MPDUs. The originator may split the block of frames across TXOPs, separate the data transfer and the Block Ack exchange, and interleave blocks of MPDUs carrying all or part of MAC service data units (MSDUs) or aggregate MSDUs (A-MSDUs) for different TIDs or receiving station addresses (RAs).

Figure 6:
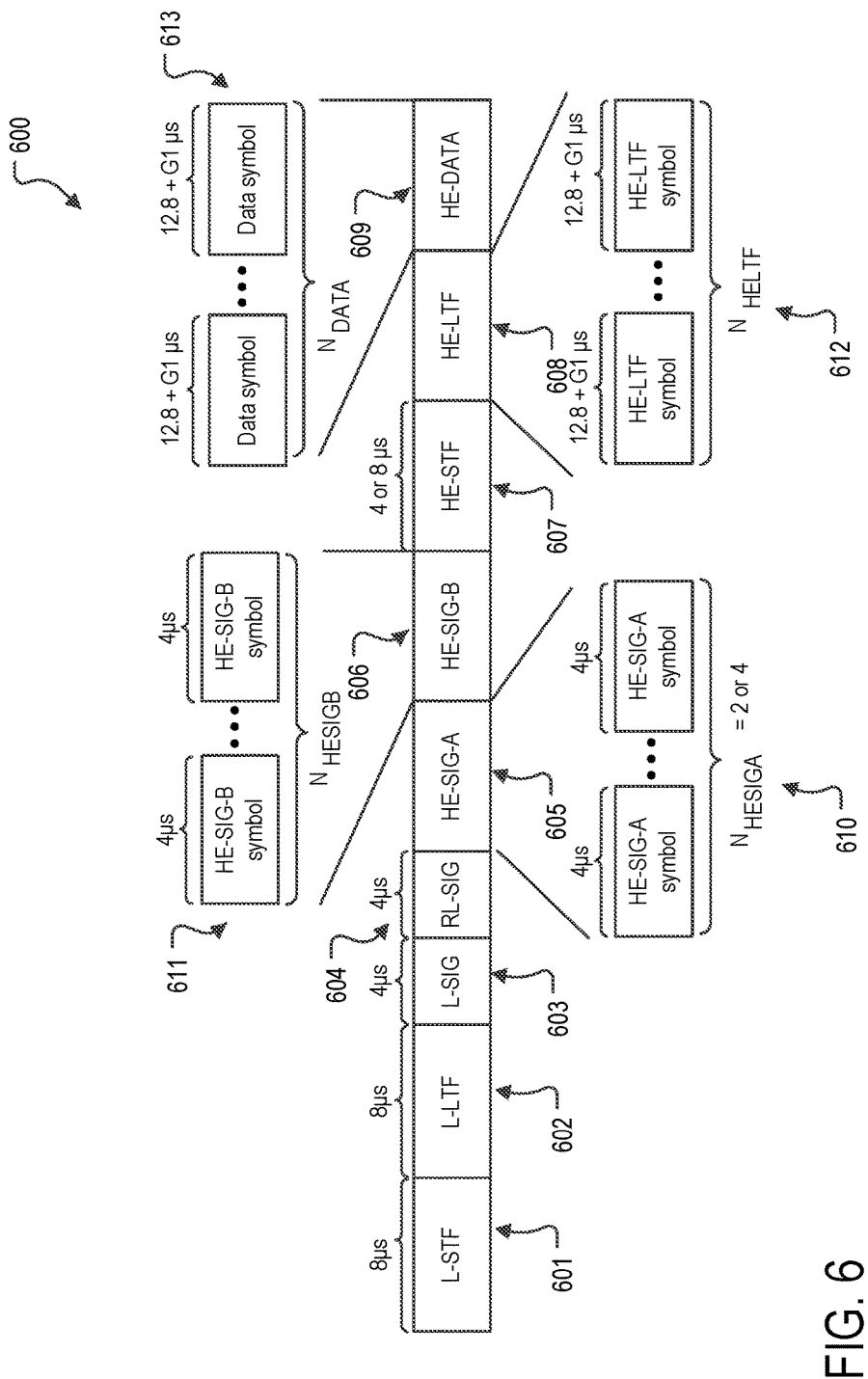
FIG. 6 illustrates a schematic diagram of an example of a format of a high efficiency (HE) physical layer convergence procedure (PLCP) protocol data unit (HE PPDU) frame.

FIG. 6 illustrates a schematic diagram of an example of a format of a high efficiency (HE) physical layer convergence procedure (PLCP) protocol data unit (HE PPDU) frame 600. A transmitting STA generates the PPDU frame 600 and transmits the PPDU frame 600 to a receiving STA. The receiving STA receives, detects, and processes the PPDU frame 600. The PPDU frame 600 includes an L-STF field 601, an L-LTF field 602, an L-SIG field 603, an RL-SIG field 604, an HE-SIG-A field 605, an HE-SIG-B field 606, an HE-STF field 607, an HE-LTF field 608, and an HE-DATA field 609. The HE-SIG-A field 605 includes $N_{HESIGA}$ symbols 610, the HE-SIG-B field 606 includes $N_{HESIGB}$ symbols 611, the HE-LTF field 608 includes $N_{HELTF}$ symbols 612, and the HE-DATA field 609 includes $N_{DATA}$ symbols 613.

An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Referring to FIG. 6, the HE frame 600 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 µs, respectively. Presence of these symbols can make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHI, and MAC properties of a PPDU. Several sub-fields may be located either in the HE-SIG-A and/or HE-SIG-B fields. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 600 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 μs and a subcarrier spacing of 312.5 kHz. For a 20 MHz channel, an FFT size of 256 is associated with a DFT period of 12.8 μs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the FFT size. The subcarrier spacing is the reciprocal of the DFT period.

The HE header may further include HE-STF and HE-LIT fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LIT field may occupy the entire channel bandwidth of the frame. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload, PSDU, or Media Access Control (MAC) Protocol Data Units (MPDU) (e.g., MAC frame).

In one or more aspects, additional one or more HE-LTF fields may be included in the header. For example, an additional HE-LTF field may be located after a first HE-LTF field. The HE-LTF fields may be, for example, modulated/carried with FFT size of 64 on a 20 MHz channel and may be included as part of the first part of the HE frame 600. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

FIGS. 7 through 12 show examples of downlink DL frames and uplink (UL) frames. In one aspect of the disclosure below, a downlink frame may refer to a DL OFDMA frame, a HE DL OFDMA frame, a DL OFDMA PPDU, a HE DL OFDMA PPDU, a DL PPDU, a DL MU frame, a DL MU MIMO frame, or vice versa. In one aspect, an uplink frame may refer to a UL OFDMA frame, a HE UL OFDMA frame, a UL OFDMA PPDU, a HE UL OFDMA PPDU, a UL PPDU, a UL MU frame, a UL MU MIMO frame, a MU ACK frame, a MU ACK PPDU, or vice versa. In one aspect, a PPDU refers to a HE PPDU or an OFDMA PPDU. In one aspect, a PPDU is a downlink frame (e.g., 700) or an uplink frame (e.g., 720). A frame may refer to a PPDU, a Media Access Control (MAC) Protocol Data Unit (MPDU) MPDU, or an A-MPDU.

In one or more aspects, a DL OFDMA frame (e.g., 700) is sent to a set of STAs. After a predetermined time period (e.g., SIB) after the receipt of the DL OFDMA frame, each STA of the same set of the STAs or each STA of a subset of the STAs replies with an individual ACK frame or BA frame in the form of a MU ACK frame (or a UL OFDMA PPDU 720). In one aspect, a PHY processor 215 or a TX signal processing unit 280 generates the frames and their components shown in FIGS. 7 through 12.

In FIGS. 7 through 12, the horizontal dimension represents the time dimension or number of OFDM symbols, whereas the vertical dimension represents the frequency dimension, number of tones or number of sub-carriers. Note that for a given FFT size, the number of tones is given, however, depending on the sub-carrier spacing, two OFDM symbols with e.g., FFT=64 and FFT=256 can occupy the same bandwidth. In one or more implementations of the present disclosure, a sub-band refers to a set of contiguous tones or subcarriers that as a whole are assigned for a payload whose expected destination is a single STA, or a set of STAs. In one or more implementations, a sub-band is a horizontal partition of an OFDMA PPDU or frame where a set of contiguous tones for a contiguous set of OFDM symbols are designated for a given payload whose expected destination is a STA or a set of STAs.

Legacy STF/LTF/SIG (e.g., 701) are several symbols based on an early design of an IEEE 802.11 specification. Presence of these symbols can make any new design compatible with the legacy designs and products. In one or more implementations, the legacy STF, LTF and SIG symbols are modulated/carried with FFT size of 64 on a 20 MHz sub-channel and are duplicated every 20 MHz if the DL OFDMA PPDU has a bandwidth wider than 20 MHz.

In one or more aspects, the HE SIG-A and HE SIG-B are symbols that carry control information that may be vital regarding each PSDU and regarding the radio frequency (RF), PHY and MAC properties of the PPM. In the present disclosure, several fields are located either in HE SIG-A and/or HE SIG-B. The HE SIG-A and HE SIG-B can be carried/modulated using FFT size of 64 or 256 depending on implementation. In some aspects, the HE SIG-B is not present in all UL OFDMA PPDUs.

The HE STF and HE LTF are symbols used to perform necessary RF and PHY processing for each PSDU and/or for the whole PPDU. Depending on whether the HE STF/LTF symbols are beamformed, there may be two sets of such symbols.

FIGS. 7 through 12 illustrate schematic diagrams of examples of downlink and uplink frames in an OFDMA exchange among WLAN devices. With reference to these figures, in one or more implementations, OFDMA-based 802.11 technology is utilized, and for the sake of brevity, a STA refers to a non-AP HE STA, and an AP refers to a HE AP. In one or more aspects, a STA may act as an AP.

In FIGS. 7 through 12, a reference numeral 700 is used for a DL OFDMA PPDU, a reference numeral 709 is used for a payload section of a DL OFDMA PPDU, a reference numeral 720 is used for a UL OFDMA PPDU, and a reference numeral 726 is used for a payload section of a UL OFDMA PPDU, all for simplicity and convenience. These components with the same reference numerals have certain characteristics that are the same, but as different figures illustrate different examples, the same reference numeral does not indicate that a component with the same reference numeral has the exact same characteristics. While the same reference numerals are used for these components, examples of differences with respect to a component are described in connection with different figures.

In one aspect, a DL OFDMA PPDU 700 is followed by a UL OFDMA PPDU 720 after a predetermined time period (e.g., SIFS) has elapsed. In one aspect, a DL OFDMA PPDU 700) includes a header (e.g., 710) and a payload (e.g., 709). In one aspect, a UL OFDMA PPDU (e.g., 720) includes a header (e.g., 721) and a payload (e.g., 726).

In one aspect, a header is referred to as a preamble header, a preamble, a header section, or vice versa. For the sake of brevity, a header may refer to a component of a header. Thus, in one aspect, a header may refer to one or more headers (e.g., a header 710 for headers 701, 702, 703 and 704; a header 701 for legacy STF, LTF and SIG). In one aspect, a header is associated with a bandwidth of a PPDU. In one example, for a given bandwidth (e.g., 80 MHz) of a PPDU, a header is modulated on the entire bandwidth of the PPDU (e.g., entire 80 MHz). In another example, a header is modulated on a sub-channel (e.g., 20 MHz sub-channel) of the bandwidth 80 MHz) and the modulated signal is duplicated on each of the remaining sub-channels (e.g., remaining three 20 MHz sub-channels) of the bandwidth.

In one aspect, a payload includes multiple payloads or PSDUs. The term PSDU refers to a PLCP service data unit. A PSDU for downlink (e.g., 705) is associated with a sub-band of the bandwidth of its PPDU (e.g., 700) and is modulated using the sub-band rather than the entire bandwidth of the PPDU. A PSDU for uplink (e.g., 722) is associated with a sub-band of the bandwidth of its PPDU (e.g., 720) and is modulated using the sub-band rather than the entire bandwidth of the PPDU. In one aspect, the modulation involves inverse Fourier transformation performed, for example, by an inverse Fourier transformer 284 in FIG. 3A.

A MU ACK frame in the form of an UL OFDMA PPDU 720 includes ACK or BA frames from the STAs e.g., STAs that receive and determine that an associated payload in the DL OFDMA PPDU 700 has an ACK policy field in a QoS control field set to 00 or "Normal Ack or Implicit Block Ack Request"). For example, STA1 determines (e.g., detects, searches for, checks, acknowledges and/or verifies) the ACK policy field in the QoS control field included in a PSDU payload 705 of the DL OFDMA PPDU 700 received by STA1.

Figure 7:
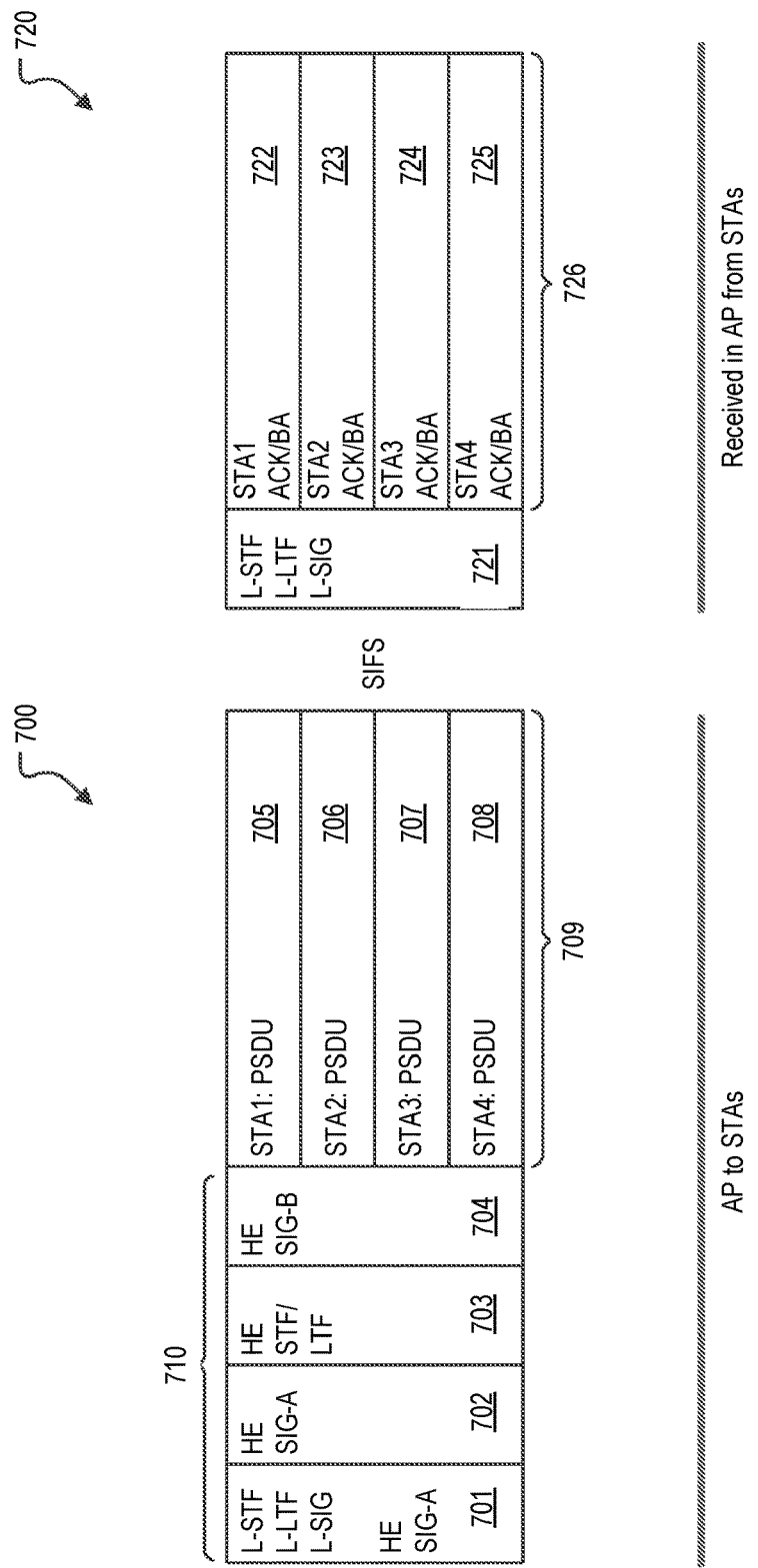
FIGS. 7 through 11 illustrate schematic diagrams of examples of a downlink OFDMA frame and an uplink OFDMA frame with varying uplink multi-user (MU) acknowledgment assignments.

Referring to FIG. 7, in an example of operation, an AP (e.g., wireless communication device 111) transmits the DL OFDMA PPDU 700 in a HE PPDU format. In one aspect, the HE PPDU format is comprised of a legacy header, a HE header (e.g., a HE SIG-A 702, a HE STF/LTF 703, a HE SIG-B 704) and a payload section 709 (e.g., PSDUs). In some aspects, the legacy header 701 consists of L-STF, L-LTF and L-SIG. In one aspect, L-STF, L-LTF and L-SIG symbols are modulated with an FFT size of 64 on a 20 MHz sub-channel and the modulated symbols are duplicated on every 20 MHz sub-channel if the DL OFDMA PPDU 700 has a bandwidth wider than 20 MHz.

In one or more implementations, a HE PLCP is composed of all or part of the HE SIG-A 702, the HE STF/LTF 703 (which are HE STF and HE LTF) and the HE SIG-B 704. The HE SIG-A 702 is modulated with an FFT size of 64 and duplicated on all of the 20 MHz sub-channels that the DL OFDMA PPDU 700 consists of, if the DL OFDMA PPDU 700 has a bandwidth wider than 20 MHz. The HE STF/LTF 703 and the HE SIG-B 704 are modulated with an FFT size of 256 and modulated over the entire bandwidth of the DL OFDMA PPDU 700.

The payload section 709 includes payloads (e.g., PSDUs) assigned to multiple STAs, and is modulated using an FFT size of 256. In this regard, the payloads are associated with STA1, STA2, STA3, and STA4, For example, the PSDU payload 705 is associated with STA1, PSDU payload 706 is associated with STA2, PSDU payload 707 is associated with STA3, and PSDU payload 708 is associated with STA4. The AP transmits the payloads through sub-bands of possibly varying bandwidth, and possibly non-contiguous sub-bands for STAs in one aspect, each set of sub-bands is associated with its respective PSDU. In one aspect, each set of sub-bands is associated with its respective STA. In one aspect, the number of assigned sets of sub-bands is the same as the number of STAs. In FIG. 7, the sub-bands assigned to STA1, STA2, STA3, and STA4 have equal bandwidth and the sub-bands are contiguous; however, the procedure described in the present disclosure does not require contiguous or equal bandwidth for sets of assigned sub-bands.

A DL OFDMA PPDU has a predetermined bandwidth, e.g., 20 MHz, 40 MHz, 80 MHz, 160 MHz, or 80+80 MHz (i.e., two 80 MHz). A sub-band is a portion of the bandwidth of a DL OFDMA PPDU. For example, when the bandwidth of a DL OFDMA PPDU is 20 MHz, and there are four STAs, each of the sub-bands associated with a respective one of the STAs is 5 MHz in bandwidth. When the bandwidth is 40 MHz, each of the four sub-bands associated with a respective one of the four STAs may be 10 MHz in bandwidth. When the bandwidth is 80 MHz, each of the four sub-bands associated with a respective one of the four STAs may be 20 MHz in bandwidth. These are merely examples, and the present disclosure is not limited to these examples. A bandwidth (e.g., 20 MHz, 40 MHz, 80 MHz, 160 MHz, or 80+80 MHz) of a DL OFDMA PPDU may be referred to as a DL bandwidth, a DL PPDU bandwidth, or an overall DL bandwidth. A bandwidth (e.g., 20 MHz, 40 MHz, 80 MHz, 160 MHz, or 80+80 MHz) of a UL OFDMA PPDU may be referred to as a UL bandwidth, a UL PPDU bandwidth, or an overall UL bandwidth. An overall bandwidth or an entire bandwidth may refer to a DL bandwidth or a UL bandwidth.

Upon the completion of the sequence of (a) the receipt of the DL OFDMA PPM 700 by the STAs and (b) the passing of the time period of the SIFS, each of the STAs that determines that its ACK policy field in the QoS control field of its PSDU (e.g., data frame) in the DL OFDMA PPDU 700 is set to 00 or "Normal Ack or Implicit Block Ack Request," transmits its ACK or BA frame simultaneously in the format of the UL OFDMA PPDU 720 (which may be referred to as a MU ACK frame). The UL OFDMA PPDU 720 is composed of a legacy PLCP 721 and a payload section 726, which are transmitted by all of the STAs that participate in forming the MU ACK frame.

In this example, each STA transmits its uplink frame that includes a header (e.g., a legacy PLCP 721) and its acknowledgment frame (e.g., one of 722, 723, 724 or 725 associated with the STA). The UL OFDMA PPDU 720 is an uplink frame that includes a header (e.g., a legacy PLCP 721) and the acknowledgment frames (e.g., all of 722, 723, 724 or 725) from all of the STAs that participate in forming the MU ACK frame.

For example, STA1 generates and transmits a first uplink frame comprised of a legacy PLCP 721 and an acknowledgment frame 722 (e.g., an ACK or BA frame), STA2 generates and transmits a second uplink frame comprised of a legacy PLCP 721 and an acknowledgment frame 723 (e.g., an ACK or BA frame), STA3 generates and transmits a third uplink frame comprised of a legacy PLCP 721 and an acknowledgment frame 724 (e.g., an ACK or BA frame), and STA4 generates and transmits a fourth uplink frame comprised of a legacy PLCP 721 and an acknowledgment frame 725 (e.g., an ACK or BA frame). All of the first, second, third and fourth uplink frames are RF combined or aggregated to form a final uplink frame, which is the UL OFDMA PPDU 720, for the AP. As all of the STAs are synchronized and transmit their respective uplink frames (e.g., the first, second, third and fourth uplink frames) at the same time (e.g., upon the completion of a predetermined time period of SIFS), all of these frames are multiplexed simultaneously into the uplink frame 720.

In one or more aspects, for an uplink frame, each STA (e.g., each of STA1, STA2, STA3 and STA4) generates a legacy PLCP 721 utilizing the entire UL channel bandwidth. A legacy PLCP 721 of a STA is associated with the entire UL channel bandwidth (rather than a sub-band). A legacy PLCP 721 of a STA occupies the entire UL channel bandwidth. In one aspect, a STA modulates a legacy PLCP 721 utilizing the entire UL channel bandwidth. For example, if the UL channel bandwidth is 80 MHz, a STA modulates the legacy PLCP with FFT size of 64 on a 20 MHz sub-channel and duplicates the modulated legacy PLCP on the remaining three 20 MHz sub-channels so that the legacy PLCP occupies the entire 80 MHz bandwidth.

In one or more aspects, each STA generates an acknowledgment frame (e.g., 722, 723, 724, or 725) utilizing a sub-band assigned to the STA (rather than the entire UL channel bandwidth). An acknowledgment frame of a STA is associated with a sub-band (rather than the entire channel bandwidth). An acknowledgment frame of a STA occupies a sub-band assigned to the STA. A sub-band is a portion of a UL channel bandwidth, and a STA modulates an acknowledgment frame utilizing a sub-band.

In one aspect, a baseband processor (e.g., a baseband processor 210 in FIG. 2, or more specifically, e.g., a MAC processor 211) of a STA can generate and provide an acknowledgment frame. In one aspect, a baseband processor (e.g., a baseband processor 210 in FIG. 2, or more specifically, e.g., a PHY processor 215 or a TX signal processing unit 280) of a STA can generate and facilitate transmission of an uplink frame directed to an AP.

In one aspect, the UL OFDMA PPDU 720 has a bandwidth that is the same as the bandwidth of the preceding DL OFDMA PPDU 700. The legacy PLCP 721 (of each of the first, second, third and fourth uplink frames) is associated with the bandwidth of the UL OFDMA PPDU 720. Likewise, the legacy PLCP 721 of the UL OFDMA PPDU 720 is associated with the bandwidth of the UL OFDMA PPDU 720.

Each of the acknowledgment frames of the STAs is associated its respective sub-band, where a sub-band is a portion of the bandwidth of the UL OFDMA PPDU 720.

In some aspects, the legacy PLCP 721 (of each of the first, second, third and fourth uplink frames and the UL OFDMA PPDU 720) consists of the STF, the LTF and the SIG symbols, which are modulated with an FFT size of 64 on a 20 MHz sub-channel, and the modulated signal is duplicated every 20 MHz sub-channel if the UL OFDMA PPDU 720 has a bandwidth wider than 20 MHz. A legacy PLCP 721 thus utilizes the entire bandwidth (e.g., by duplication as described above).

In one aspect, the payload section 726 has multiple payloads (e.g., PSDUs) for of the STAs that participate in forming the MU ACK frame, and is modulated using an FFT size of 256. In this regard, a payload is associated with its respective one of STA1, STA2, STA3, and STA4. In FIG. 7, the STA1, the STA2, the STA3 and the STA4 participate in thrilling the UL OFDMA PPDU 720. For example, the ACK/BA payload 722 is associated with STA1, ACK/BA payload 723 is associated with STA2, ACK/BA payload 724 is associated with STA3, and ACK/BA payload 725 is associated with STA4.

Figure 8:
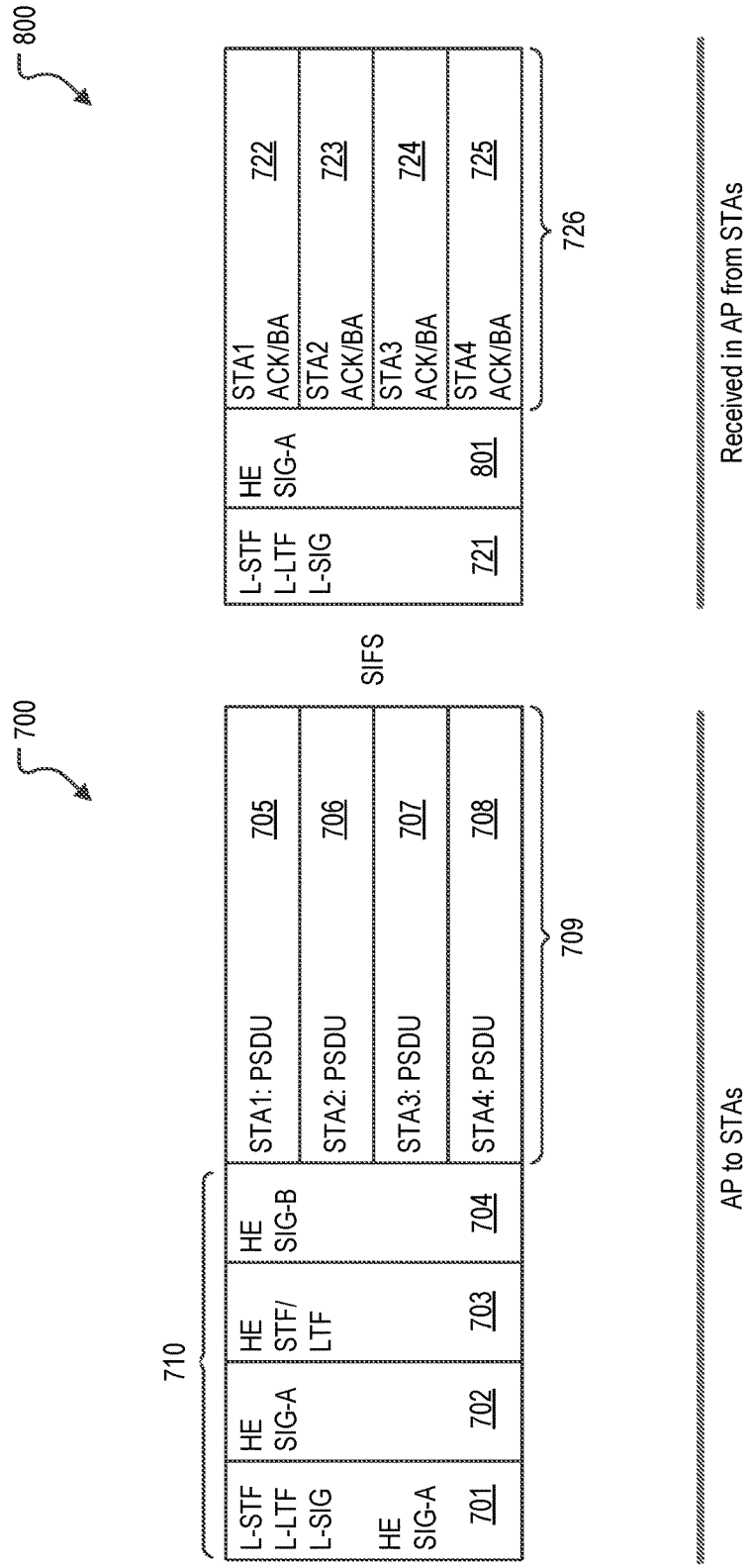

FIG. 8 shows a similar exchange as in FIG. 7 except that a UL OFDMA PPDU 800 has additional signaling between the legacy PLCP 721 and the payload section 726. In this regard, examples of differences are described in FIG. 8 for purposes of simplicity.

In this configuration, the UL OFDMA PPDU 800 is comprised of not only the legacy PLCP 721 and the payload section 726 but also a partial HE PLCP. In one or more implementations, the partial HE PLCP consists of a HE SIG-A field 801, which is modulated using an FFT size of 64 and duplicated on all of the 20 MHz sub-channels that the UL OFDMA PPDU 720 consists of. The HE SIG-A field 801 may be present either with multiple symbols or only with a first symbol referred to as a HE SIG-A1.

In one aspect, the content of a HE SIG-A field 801 of a UL OFDMA PPDU 800 from an intended STA is already known by the recipient (e.g., AP). In one aspect, the HE SIG-A is useful for unintended STAs to obtain some vital information about the frame and defer properly, and such information can be provided in HE SIG-A or the first symbol of the HE SIG-A. Examples of the above-mentioned vital information are: (a) the duration of the uplink (MU UL) frame and in this the duration of MU ACK frame and (b) an indication whether there can be a (downlink) response frame to the uplink (MU UL) frame. Unintended STA(s) may be one or more STAs that are not intended (or required by the AP) to participate in forming a MU ACK frame; however, they may monitor the wireless medium in order to send their frame. Given the possibility of such unintended STAs, and given that HE SIG-A is encoded robustly so that it can be often decoded successfully; the above-mentioned vital information gives some information about the status of the medium to the unintended STAs.

In this example, the bandwidth of the DL OFDMA PPDU 700 and the bandwidth of the subsequent UL OFDMA PPDU 800 are the same. For example, the bandwidth may be 20 MHz where each of the sub-bands assigned to each STA has 5 MHz of bandwidth, or the bandwidth may be 80 MHz where each of the sub-bands has 20 MHz of bandwidth.

Figure 9:
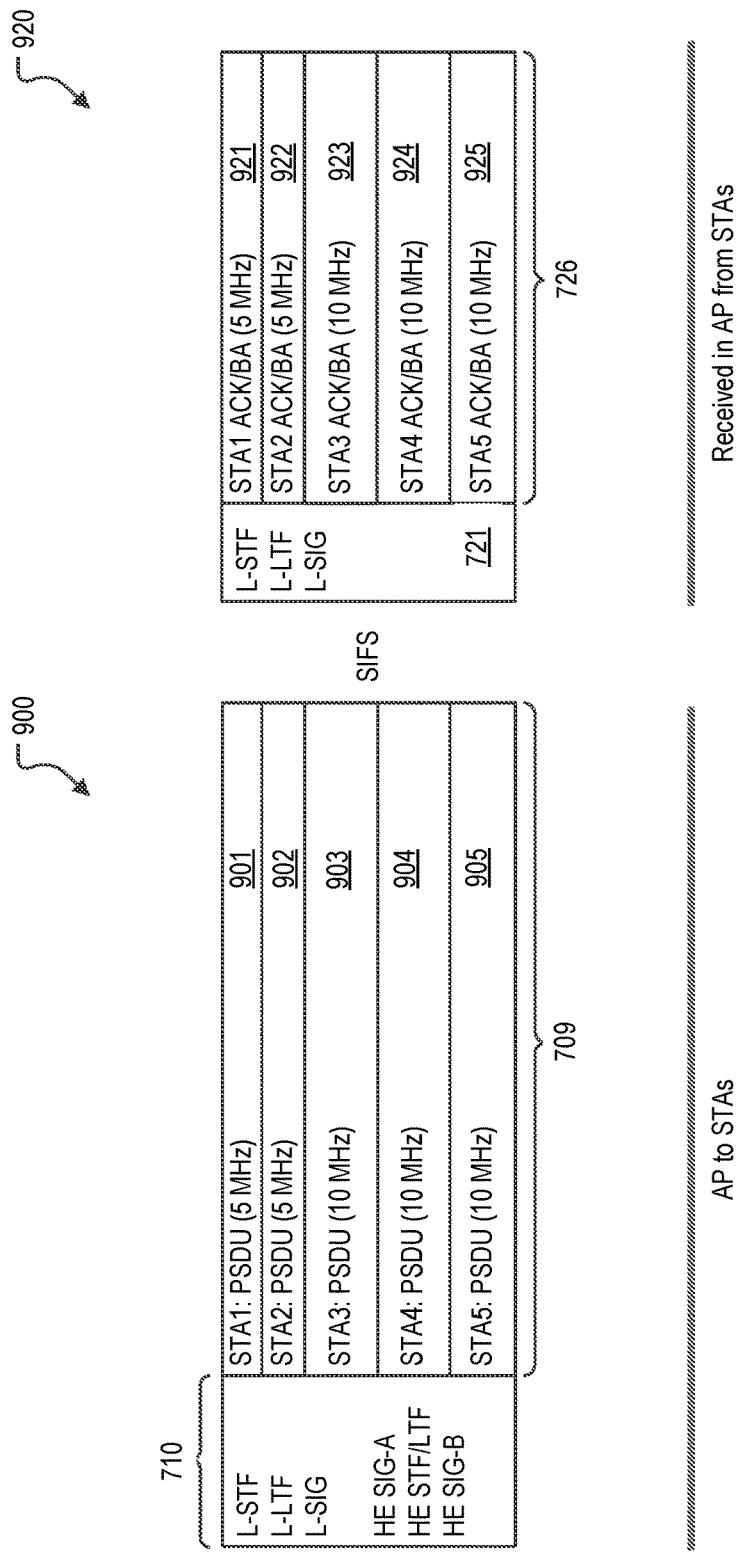

FIG. 9 illustrates a schematic diagram of an example of a downlink frame and an uplink frame for an OFDMA exchange among WLAN devices. In this case, the DL OFDMA PPDU 900 includes a header section 710 comprised of the legacy PLCP 701, the HE SIG-A 702, the HE STF/LTF 703 and the HE SIG-B 704. The payload section 709 contains multiple PSDU payloads where PSDU 901 is associated with STA1, PSDU 902 is associated with STA2, PSDU 903 is associated with STA3, PSDU 904 is associated with STA4 and PSDU 905 is associated with STA5. The UL OFDMA. PPDU 920 includes the legacy PLCP 721 and the payload section 726. The payload section 726 includes multiple ACK/BA payloads where ACK/BA payload 921 is associated with STA1, ACK/BA payload 922 is associated with STA2, ACK/BA payload 923 is associated with STA3, ACK/BA payload 924 is associated with STA4, and ACK/BA payload 925 is associated with STA5.

In this case, a similar exchange as in FIG. 7 is illustrated except that the STAs that receive payloads in the DL OFDMA PPDU 900 do not all have the same sub-band bandwidths. For example, the overall (or entire) bandwidth of DL OFDMA PPDU 900 (or UL OFDMA PPDU 920) may be 40 MHz, where each of the three STAs (e.g., each of STA3, STA4 and STA5) has a sub-band with 10 MHz bandwidth, and each of the two STAs (e.g., each of STA1 and STA2) has a sub-band with 5 MHz bandwidth. In this example, each STA responds with an ACK or a BA frame in the same sub-band that the STA has received its payload in the DL OFDMA PPDU 900 after the SIFS 412 has elapsed. Note that due to different sizes of the sub-bands, one or more of the STAs may need to pad the respective one or more payloads for the ACK or BA frame so that all of the PSDUs formed by the participating STAs in the payload section 726 have an equal time duration. By having the STAs respond with the same sub-band bandwidth as the downlink sub-band bandwidth, the amount of processing and/or overhead may be minimized during the generation of the UL OFDMA PPDU 920 thereby increasing efficiency in the overall acknowledgment mechanism.

Figure 10:
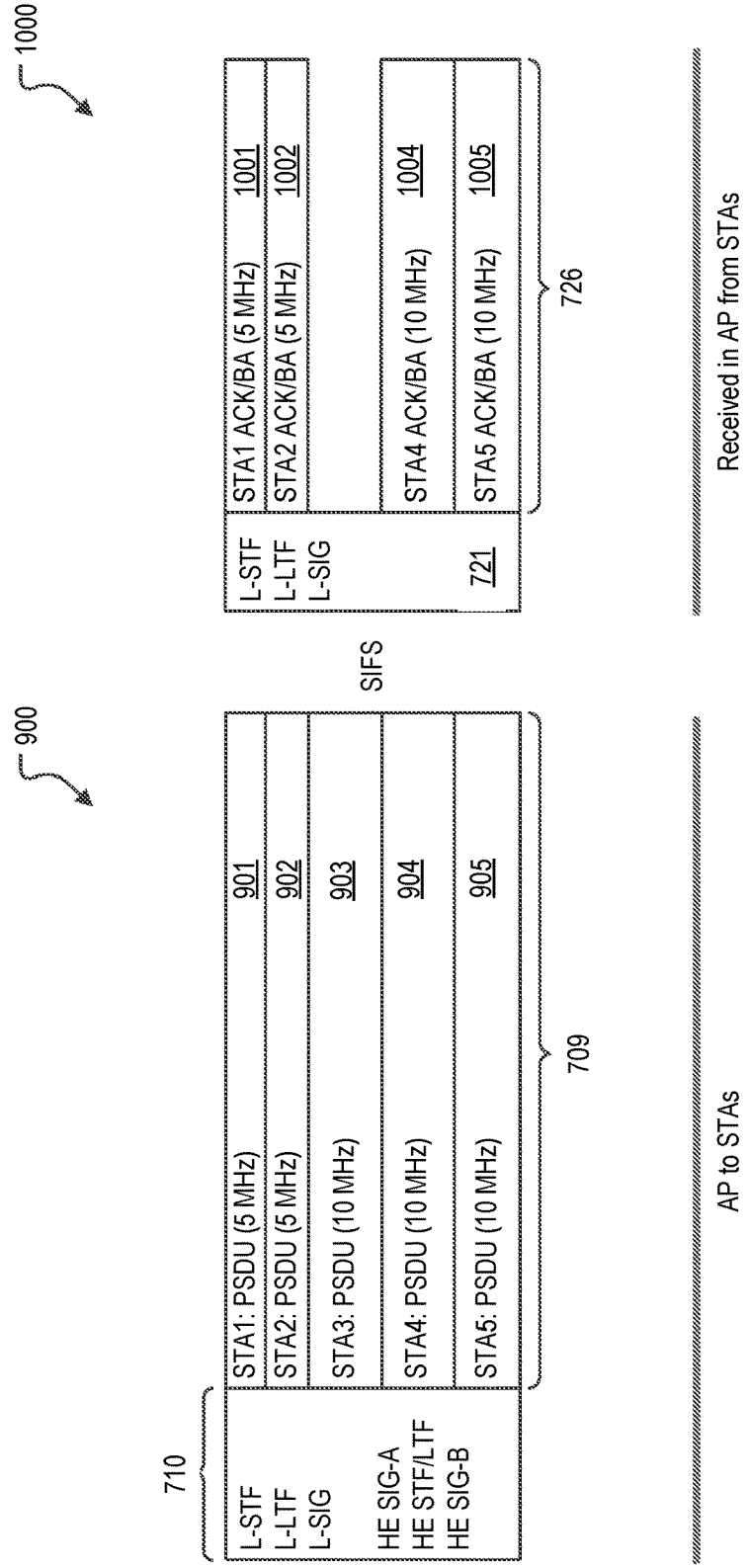

FIG. 10 illustrates a schematic diagram of an example of a downlink frame and an uplink frame for an OFDMA exchange among STAs. In this case, the exchange is similar to FIG. 7 and FIG. 9, except that the STAs that receive payloads in the DL OFDMA PPDU 700 do not all have the same sub-band bandwidths and one of the STAs does not respond with an ACK or BA, for example, because the corresponding ACK policy field in the QoS control field of the DL OFDMA PPDU 700 is not set to "Normal Ack or Implicit Block Ack Request," because the DL PSDU has been received by the STA in error, or because there has been an error or failure in receipt. For example, STA3 does not transmit an uplink frame with an ACK or BA for a UL OFDMA PPDU 1000 because, among others, the STA3 determines that it is instructed not to participate in forming a MU ACK frame (e.g., STA3 did not find the ACK policy field identifying the STA3 as a participant in the MU ACK frame formation), or the associated PSDU (e.g., PSDU payload 904) has been received in error by the STA3. A PSDU payload may not be received by the corresponding STA due to one or more reasons, including but not limited to, the PSDU was corrupted during transmission, the transmission was impacted by interference, the QoS control field indicated that the ACK policy field was not set for MU ACK participation, etc.

In one or more implementations, the AP does not detect that there is a missing PSDU in one or more received sub-bands assigned to the corresponding STAs, e.g., STA3, and may process the received signal (e.g., the UL OFDMA PPDU 1000). However, after processing the PSDU in the sub-band location and obtaining the frame check sequence (FCS), the AP (e.g., 210 or 211 of the AP) can identify that neither ACK nor BA is present in the sub-band location. In this regard, and if the AP originally had not set the QoS control field of the DL OFDMA PPDU to "Normal Ack or Implicit Block Ack Request," the AP can determine that the corresponding PSDU (e.g., 904) can need to be retransmitted for the associated STA (e.g., STA3), and the AP may retransmit the DL OFDMA PPDU that contains the PSDU 904.

In the process of forming the DL OFDMA PPDU 900 and the UL OFDMA PPDU 1000, a TXVECTOR parameter and a RXVECTOR parameter are employed (as described with reference to FIG. 2), each of which is denoted by a subcarriers list, a sub-band list, or an RU list (e.g., SUBCARRIERS_LIST, SUBBAND_LIST, or RU_LIST). The SUBCARRIERS_LIST is a scalar value that may be used in a HE OFDMA PPDU or a HE OFDMA PPDU with a partial PLCP or PRY header. In some aspects, the SUBCARRIERS_LIST in the TXVECTOR/RXVECTOR parameters is a set of scalar values where each scalar value indicates a set of sub-carriers, or equivalently a sub-band or set of sub-bands (where each sub-band is a set of sub-carriers). In one or more implementations, a SUBCARRIERS_LIST is a predetermined list (a priori) known to the AP and all STAs. In this case, the SUBCARRIERS_LIST represents a listing of index values, where each index value represents a corresponding sub-band allocation for a subsequent acknowledgment frame. As such, the AP can only need to indicate an index of the SUBCARRIERS_LIST in order to assign a particular sub-band to a STA.

In one or more implementations, a SUBCARRIERS_LIST is included in a TXVECTOR parameter, and a MAC processor 211 (FIG. 2) sends the TXVECTOR parameter with the SUBCARRIERS_LIST to a PHY processor 215 no that the PHY processor 215 can determine which set of sub-carriers (or set of sub-bands) is used to place the payload in a DL OFDMA PPDU 900. In one or more implementations, a SUBCARRIERS_LIST may optionally be included in an RXVECTOR parameter, and a PHY processor 215 sends the RXVECTOR parameter with the SUBCARRIERS_LIST to a MAC processor 211 so that the MAC processor 211 can determine from which set of sub-carriers (or set of sub-bands) of the OFDMA PPDU 1000, the received payload 726 was obtained.

In forming the UL OFDMA PPDU 1000 (or a MU ACK frame), each participating STA forms a frame in the form of a MU ACK frame, as follows: (a) the legacy PLCP, (b) the partial HE PLCP part (if utilized as shown in, e.g., FIG. 8), and (c) a PSDU that is to be transmitted on a given sub-band. In this example, the legacy PLCP 721 consists of the STF, LTF and SIG symbols modulated with an FFT size of 64 on a 20 MHz sub-channel and duplicated for every 20 MHz sub-channel if the immediately preceding DL OFDMA PPDU 900 has a bandwidth wider than 20 MHz. In one aspect, the partial HE PLCP part consists of the HE SIG-A 801 using an FFT size of 64 and duplicated on all of the 20 MHz sub-channels that the immediately preceding DL OFDMA PPDU 900 consists of. The payload section 726 includes PSDUs from participating STAs. A PSDU is a payload for a given STA, and is modulated using an FFT size of 256. Each participating STA forms a portion of the payload section 726 with a PSDU in the sub-band (or sub-carrier) designated by the SUBCARRIERS_LIST of the immediately preceding DL OFDMA PPDU 900. In one or more implementations, the MU ACK frame is formed without the partial HE PLCP part (e.g., the HE SIG-A 801).

In one or more aspects, a legacy PLCP 721 of a UL OFDMA PPDU 1000 (or a MU ACK frame) is formed as follows. All of the participating STAs that send an uplink frame that is in the form of a MU ACK frame, form the legacy PLCP 721 (e.g., with an FFT size 64 for the bandwidth of 20 MHz). In some aspects, if the immediately preceding DL OFDMA PPDU 900 has a bandwidth of 40 MHz, then the legacy PLCP 721 includes two identical parts over two 20 MHz channels for a total bandwidth of 40 MHz. In other aspects, if the immediately preceding DL OFDMA PPDU 900 has a bandwidth of 80 MHz, then the legacy PLCP 721 includes four identical parts for a total bandwidth of 80 MHz. In still other aspects, if the immediately preceding DL OFDMA PPDU 900 has a bandwidth of 160 MHz or 80+80 MHz, then the legacy PLCP 721 includes eight identical parts for a total bandwidth of 160 MHz.

The STE and LTF parts (also referred to as L-STE and L-LTF) of the legacy PLCP 721 are formed according to the IEEE 802.11 specifications for HT and VHT compliant WLAN devices. The SIG part (also referred to as L-SIG) is encoded according to the 802.11 specifications for HT and VHT compliant WLAN devices.

In some instances, a STA generates and transmits to the AP an MU ACK frame whose length corresponds or is identical to the length of a frame eliciting the response. For example, in one or more implementations, a L_LENGTH parameter in the TXVECTOR parameter associated with the MU ACK frame is set to a corresponding value indicated in a MUACK-L-LENGTH parameter of a HE control field of the immediately preceding DL OFDMA PPDU 900. In one aspect, L_LENGTH is a length of a PSDU of a UL OFDMA PPDU 1000. In one or more implementations, a MUACK-L-LENGTH parameter is indicated in another part of the immediately preceding DL OFDMA PPDU 900, such as in the HE SIG-A 702 (FIG. 7) or the HE SIG-B 704 (FIG. 7) symbol(s) of the immediately preceding DL OFDMA PPDU 900. In some aspects, the L_LENGTH parameter in the TXVECTOR parameter associated with the MU ACK frame is set to a value corresponding to MUACKMaxLength. In one or more implementations, the MUACKMaxLength is a fixed value calculated based on a maximum possible length of a BA frame when modulated with MCS0 (e.g., BPSK at coding rate of ½) or MCS1 (e.g., QPSK at coding rate of ½). In some aspects, an AP (e.g., the wireless communication device 111) announces the parameter MUACKMaxLength during association. In other aspects, the AP announces the MUACKMaxLength in beacon frames. In some other aspects, the MUACKMaxLength parameter is set to a predetermined value (or a fixed value a priori), such that all of the STAs that participate in forming the MU ACK frame are configured to use identical values for the MUACKMax-Length parameter.

In some embodiments, the HE SIG-A 702 or the HE SIG-B 704 symbol(s) of an immediately preceding DL MU PPDU carries an indication of the frame length of the multiplexed ACK/BA responses. In other embodiments, the indication of the frame length of multiplexed ACK/BA frames may be in the form of a maximum duration of the payload of each ACK/BA frame as units of time, such as units of 4 μs or 12 μs. In still other embodiments, the indication of the frame length of multiplexed ACK/BA frames may be in the form of a maximum number of OFDM symbols that a payload of each ACK/BA frame takes. In yet other embodiments, the indication of the frame length of multiplexed ACK/BA frames may be in the form of a multiplier of a unit interval, where the unit interval may be based on the duration that the payload of an ACK frame takes (calculated with the same MCS as the MCS indicated for the given multiplexed ACK/BA responses). Note that the frame length of the multiplexed ACK/BA can be used to calculate MUACK-L-LENGTH.

In one aspect, the partial HE PLCP part of the MU ACK frame that contains the HE SIG-A 801, if present, is formed with an FFT size 64 for the bandwidth of 20 MHz. In some aspects, only the first symbol of the HE SIG-A 801 symbols, sometimes referred to as HE SIG-A1, is present in the partial HE PLCP part of the MU ACK frame. In some aspects, if the immediately preceding DL OFDMA PPDU 900 has a bandwidth of 40 MHz, then the partial HE PLCP part has two identical parts for a total bandwidth of 40 MHz. In other aspects, if the immediately preceding DL OFDMA PPDU 900 has a bandwidth of 80 MHz, then the partial HE PLCP part has four identical parts for a total bandwidth of 40 MHz. In still other aspects, if the immediately preceding DL OFDMA PPDU 900 has 160 MHz or 80+80 MHz, then the partial HE PLCP part can have eight identical parts for a total bandwidth of 160 MHz.

In some instances, a STA generates and transmits to the AP an MU ACK frame whose channel bandwidth corresponds or is identical to the channel bandwidth of a frame eliciting the response. For example, the encoding of different fields of the HE SIG-A 801 may be with the same values that have been indicated in the immediately preceding DL OFDMA PPDU 900. Particularly, parameters in the TXVECTOR parameter that are related to HE SIG-A 801 are set to values that are a priori known. However, a channel bandwidth (CH_BANDWIDTH) parameter in the TXVECTOR parameter is set to the same value as the CH_BANDWIDTH in the RXVECTOR parameter associated with the immediately preceding DL OFDMA PPDU 900. In this example, the CH_BANDWIDTH parameter may represent the channel width (20 MHz or 40 MHz) in which data is transmitted and the transmission format (e.g., HE PPDU format).

In one or more implementations, the fields in the HE SIG-A 801 are encoded with a fixed value that the AP announces during association. The AP may announce the fixed value in beacon frames. Alternatively, the AP may announce the CH_BANDWIDTH parameter as fixed values such that STAs that participate in forming the MU ACK frame use identical values for all of the fields in the HE SIG-A 801 symbols.

In some instances, a STA generates and transmits to the AP an MU ACK frame whose GI corresponds or is identical to the GI type of a frame eliciting the response. For example, in one or more implementations, in forming a HE PLCP and/or PSDU part of a MU ACK frame, a participating STA (e.g., 210 or 211 of a STA) sets a GI_TYPE parameter in the TXVECTOR parameter associated with the MU ACK frame carried in the HE PPDU format (with partial PLCP or preamble header as described above) to a value corresponding to a counterpart GI_TYPE parameter in the RXVECTOR parameter of a frame eliciting the response. In some aspects, a STA (e.g., 210 or 211 of a STA) sets the GI_TYPE parameter in the TXVECTOR parameter associated with a MU ACK frame carried in the HE PPDU format (with partial PLCP or preamble header as described above) to a LONG_GI_type, which indicates that short GI is not used in the packet. The GE_TYPE set to LONG_GI may be formed with an FFT size of 256. The LONG_GI parameter may include values such as 1.6 ηs or 3.2 µs depending on implementation.

In an UL OFDMA PPDU 1000, there may be another symbol that is called HE LTF and its role is to assist the receiver to decode the payload. In FIGS. 7-10, HE LTF is not shown for brevity. STA creates the portion of HE LTF that is associated with its assigned sub-band. HE LTF may be in various short or long formats; however, all the STAs need to use the same format for a single UL OFDMA PPDU. Hence, there are multiple embodiments in order to align the format of the HE LTF across all STAs.

In one or more implementations, all the STAs that respond with an ACK or BA frame in the form of an UL OFDMA PPDU can select the same HE LTF format (i.e., long HE LTF or compressed HE LTF) and construct the HE LTF according to this format indication. In one embodiment, the format may be indicated by the AP in the preceding DL OFDMA PPDU or DL MU PPDU (for example in the HE SIG-B symbol of DL PPDU) and all the STAs pick this indicated format to construct the HE LTF symbol of the UL OFDMA PPDU. In another embodiment, each STA can use the same HE LTF format as in the preceding DL OFDMA PPDU or DL MU PPDU. In other words, if the preceding DL OFDMA PPDU or DL MU PPDU utilizes a long HE LTF format then each STA can use a long HE LTF format to construct the HE LTF symbol in the UL OFDMA PPDU, and if the preceding DL OFDMA PPDU or DL MU PPDU utilizes a compressed HE LTF format then each STA can use a compressed HE LTF format to construct the HE LTF symbol in the UL OFDMA PPDU. In another embodiment, the STAs may use a pre-determined format and construct the HE LTF symbol of UL OFDMA frame. There are multiple ways that such pre-determined format may be communicated. For instance, the wireless devices may have such a pre-determined duration value defined/set during manufacture. In another instance, the AP may announce such pre-determined format to each STA during association time. In another instance, the AP may periodically announce such pre-determined format in Beacon frames. In another instance, the AP may use a combination of above methods to announce such pre-determined format and change the value if necessary and re-announce it to its associated STAs.

In some instances, a STA generates and transmits to the AP an MU ACK frame whose format, number of transmit chains, and/or coding type corresponds or is identical to the format, number of transmit chains, and/or coding type of a frame eliciting the response. For example, in some aspects, a participating STA sets a FORMAT parameter in the TXVECTOR parameter associated with the UL OFDMA PPDU 1000 to a value representing HE while the STA sets a N_TX parameter in the TXVECTOR parameter to one, among others. In this example, the N_TX parameter indicates the number of transmit chains. In some implementations, the STA sets a FCC_CODING parameter in the TXVECTOR parameter to BCC_CODING (e.g., binary convolutional code encoding).

In one or more implementations, a STA sets a MCS parameter in the TXVECTOR parameter to a value of zero (e.g., MCS0). In some instances, a STA generates and transmits to the AP an MU ACK frame whose MCS is identical to the MCS of a frame eliciting the response. For example, some aspects, a STA sets the MCS parameter to a value corresponding to a MUACK-MCS parameter indicated by the AP in the immediately preceding DL OFDMA PPDU 900. The MUACK-MCS parameter may be indicated in the MUACK-MCS field of the HE control field (e.g., see HT control field 807) of the immediately preceding DL OFDMA PPDU 900. The AP may announce the MUACK-MCS parameter during association or in beacon frames. In some aspects, the AP sets the MUACK-MCS parameter to a fixed value a priori, such that all of the STAs that participate in forming the MU ACK frame use identical values for the MUACK-MCS parameter.

In forming a PSDU part of the MU ACK frame, the sub-bands in the MU ACK frame that a participating STA uses to place associated PSDUs are based on of the following examples. In some aspects, the STA uses identical sub-bands from the immediately preceding DL OFDMA PPDU 900 that convey the payload for the STA. In other words, a STA that intends to send an MU ACK frame sets the SUBCARRIERS_LIST of the TXVECTOR parameter for the MU ACK frame to the same value as in SUBCARRIERS_LIST of the RXVECTOR parameter of the immediately preceding DL OFDMA PPDU 900. In this example, the SUBCARRIERS_LIST in the TXVECTOR parameter uniquely identifies the set of sub-carriers or equivalently the sub-bands that the STA uses.

Figure 11:
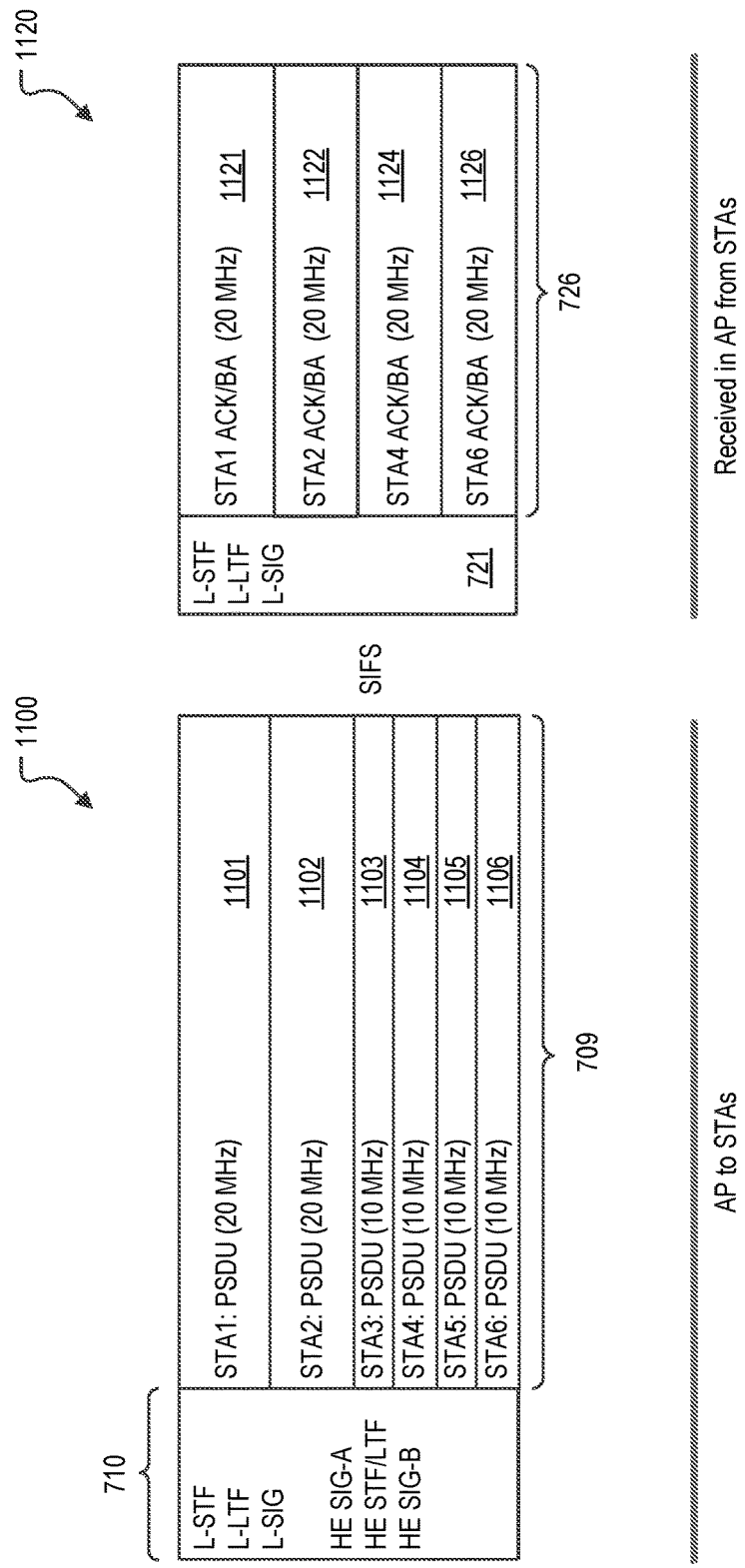

FIG. 11 illustrates a schematic diagram of an example of a downlink frame and an uplink frame for an OFDMA exchange among WLAN devices. A similar exchange as in FIG. 7 is illustrated in FIG. 11 except that the STAs that receive payloads in the DL OFDMA PPDU 1100 do not all have the same sub-band bandwidths.

In this case, the DL OFDMA PPDU 1100 includes a header section 710 comprised of the legacy PLCP 701, the HE SIG-A 702, the HE STF/LTF 703 and the HE SIG-B 704. The payload section 709 contains multiple PSDU payloads where PSDU 1101 is associated with STA1. PSDU 1102 is associated with STA2, PSDU 1103 is associated with STA3, PSDU 1104 is associated with STA4, PSDU 1105 is associated with STA5 and PSDU 1106 is associated with STA6. Here, each of the PSDUs 1101 and 1102 has a sub-band with 20 MHz bandwidth while each of the remaining PSDUs 1103-1106 has a respective sub-band with 10 MHz bandwidth.

The UL OFDMA PPDU 1120 includes a legacy PLCP 721 and a payload section 726, The payload section 726 includes multiple ACK/BA payloads where ACK/BA payload 1121 is associated with STA1, ACK/BA payload 1122 is associated with STA2, ACK/BA payload 1124 is associated with STA4 and ACK/BA payload 1126 is associated with STA6. In this example, each of the ACK/BA payloads 1121, 1122, 1124 and 1126 has a sub-band with 20 MHz bandwidth.

In this example, the bandwidth of the DL OFDMA PPDU 1100 and the bandwidth of the subsequent MU ACK frame 1120 are the same; however, in some situations the bandwidths may be different. Not all of the STAs, which have an associated payload in the DL OFDMA PPDU 1100, respond with an ACK or BA frame, and some of STAs are not expected, or not instructed, to respond since the corresponding ACK policy field in the QoS control field is not set to "Normal Ack or Implicit Block Ack Request." In addition, the sub-bands, where the ACK/BA frames of the responding STAs are placed within the payload section 726, are assigned to the STAs in a predetermined manner, which may be different from the received order of the sub-bands in the immediately preceding DL OFDMA PPDU 1100. For example, the set of sub-bands allocated for the ACK/BA frames of the participating STAs is signaled by indexing in the immediately preceding DL OFDMA PPDU 1100.

In some aspects, this indication by the AP is generated and placed in the HE SIG-A 702 or the HE SIG-B 704 symbols (part of the header 710) of the immediately preceding DL OFDMA PPDU 1100. In turn, the STA then sets the SUB-CARRIERS_LIST in the TX VECTOR parameter of the MU ACK frame based on the received indication. In such implementations, the STA is responding with a MU ACK frame containing the ACK or BA frame of that STA. Such indexing may be signaled in HE SIG-B symbol of the preceding DL OFDMA PPDU, where the AP indicates the sub-band assignment within the DL OFDMA or DL MU frame and additionally indicates the sub-band index for the upcoming ACK or BA frame within the UL OFDMA frame. For the STA(s) that no immediate ACK, or BA is expected, e.g., the QoS control field of the DL OFDMA PPDU is not set to "Normal Ack or Implicit Block Ack Request," a reserved value such as sub-band zero is signaled, indicating that no sub-band is assigned.

It can be noted that the term MU ACK frame as used in the preceding sentence refers to an uplink frame generated by one STA, and such uplink frame comprises a header (e.g., 721) and one PSDU (e.g., 1121), where the PSDU is associated with that STA and is associated with its corresponding sub-band. Such uplink frame is in a "form" of a MU ACK frame but does not include PSDUs from other STAs. Thus, in such a situation, a MU ACK frame may refer to an uplink frame (comprising a header and one PSDU) generated by one STA to participate in forming the ultimate MU ACK frame (e.g., 1120) through RF combination. In another case, the term MU ACK frame may refer to the ultimate uplink frame (e.g., 1120), which is formed by aggregating and multiplexing multiple uplink frames from multiple STAs. In this latter case, the MU ACK frame (e.g., 1120) comprises a header and multiple PSDUs. Therefore, the term MU ACK frame can be understood in context, and it may refer to an uplink frame generated by one STA to participate in forming the ultimate MU ACK frame, or it may refer to the ultimate uplink frame formed by aggregating multiple uplink frames generated by multiple STAs.

In one or more aspects, STAs transmit their respective uplink frames at the same time, and these uplink frames are RF combined or aggregated to form a single, ultimate uplink frame (or a single, ultimate MU ACK frame). The AP receives and detects this single, ultimate MU ACK frame.

In some implementations, a STA obtains a MUACK-Sub-band parameter from the HE SIG-A 702 or HE SIG-B 704 symbols of the immediately preceding DL OFDMA PPDU 1100. In this regard, the STA then sets the SUBCARRIERS_LIST parameter in the TXVECTOR parameter of the MU ACK frame with a value corresponding to the obtained MUACK-Sub-band parameter. In such implementations, the AP (e.g., 210 or 215 of an AP) sets the MUACK-Sub-band field in the HE SIG-A 702 or the HE SIG-B 704 symbol of the DL OFDMA PPDU 1100 to a value that can represent the sub-band allocation for that STA in a subsequent MU ACK frame. In other implementations, the STA (e.g. 210 or 211 of the STA) obtains the MUACK-Sub-band parameter from the RXVECTOR parameter of the immediately preceding DL OFDMA PPDU 1100.

In one or more implementations, if the AP (e.g., 210 or 211 of an AP) does not set the ACK policy field in the QoS control field to "Normal Ack or Implicit Block Ack Request," then the AP (e.g., 210 or 215 of an AP) sets the MUACK-Sub-band field in the HE SIG-A 702 or HE SIG-B 704 symbol of the DL OFDMA PPDU 1100 to an invalid or reserved value, which implies that the receiving STA does not have a sub-band allocated for sending an ACK or BA in the next MU ACK frame.

On the other hand, if the AP (e.g., 210 or 211 of an AP) sets the ACK policy field in the QoS control field to "Normal Ack or Implicit Block Ack Request" of the frame (e.g., PSDU payload) that is carried for a STA, then the AP (e.g., 210 or 215 of an AP) sets the MUACK-Sub-band field in the HE SIG-A 702 or the HE SIG-B 704 symbol in the DL OFDMA PPDU 1100 to a valid value, which represents a sub-band having been allocated for the ACK or BA frame of that STA.

In one or more implementations, the MUACK-Sub-band parameter included in the HE SIG-A 702 or the HE SIG-B 704 symbol of the DL OFDMA PPDU 1100, which may carry respective payloads intended for two STAs, is not set to the same value unless the ACK policy field in the QoS control field of the associated frames carried to the two STAs are different than "Normal Ack or Implicit Block Ack Request." The size of the MUACK-Sub-band field may vary depending on implementation, but the size may be set to index all of the allocated sub-bands within a given PPDU bandwidth. For instance, for sub-bands where each sub-band has a bandwidth of 5 MHz, the MUACK-Sub-band field has 2-bit length for PPDUs with 20 MHz bandwidth, has 3-bit length for PPDUs with 40 MHz bandwidth, has 4-bit length for PPDUs with 80 MHz bandwidth, and has 5-bit length for PPDUs with 160 MHz bandwidth.

In some aspects, an implicit indication is used instead of the MUACK-Sub-band parameter to inform each STA which sub-band has been assigned to that STA for placing a corresponding ACK/BA frame.

In one aspect, an AP may identify the number and position of the sub-bands that are allocated for MU ACK frame transmission. This implicit indication may be generated within the HE SIG-B 704 field of the DL OFDMA PPDU 1100 (by, e.g., a PHY processor 215), where the indication relates to an identification of the number of sub-bands. Note that actual location of the sub-bands may be known a priori by the AP and the STAs, given the bandwidth of the MU ACK frame. For instance, the MU ACK frame may have a 20 MHz bandwidth with nine sub-bands (where each sub-band has a 2 MHz bandwidth), or four sub-bands (where each sub-band has a 4 MHz bandwidth). In this regard, so long as the number of acknowledgment frames (which from the above example is either 9 or 4), or alternatively the bandwidth of acknowledgment sub-bands, is specified by the AP (e.g., by its baseband processor) in the DL OFDMA PPDU 1100, the STAs can be notified of the location of the sub-bands and corresponding order.

In some aspects, the order may be determined by some convention such as the sub-band with lowest frequency (or smallest sub-carrier or sub-band identification) is assigned index 1, and other sub-bands have an index incremented from index 1. For instance, the MU ACK frame has four sub-bands and, based on a predetermined convention between the AP and STAs, the top sub-band is indexed 1, and the next sub-band is indexed 2, etc., and the bottom sub-band is indexed 6.

Alternatively, the number of sub-bands for ACK/BA frames may be known a priori. For instance, if the AP expects to receive the MU ACK frame with a 20 MHz bandwidth, and each sub-band is expected to have a respective 2 MHz bandwidth, then such a priori convention between the AP and the STAs implicitly identifies the number of sub-bands for ACK/BA multiplexing. Similarly, an implicit order of the sub-bands may be understood between the AP and the STAs.

Once the number of the sub-bands for ACK/BA multiplexing and an inherent order of the sub-band are known between the AP and the STAs, then each STA can select the ACK/BA sub-band that has the same index/order as the index/order assigned to the payload of the STA via the HE SIG-B 704 of the preceding DL OFDMA PPDU 1100. For instance, the MU ACK frame has four sub-bands where the sub-bands from top to bottom are indexed 1, 2, 3 and 4 respectively. The STA whose sub-band assignment in the preceding DL OFDMA PPDU 1100 is listed first can use the ACK/BA sub-band with index 1 in the MU ACK frame. The STA whose sub-band assignment in the preceding DL OFDMA PPDU 1100 is listed second can use the ACK/BA sub-band with index 2 in the MU ACK frame. The STA whose sub-band assignment in the preceding DL OFDMA PPDU 1100 is listed third can use the ACK/BA sub-band with index 3 in the MU ACK frame. Finally, the STA whose sub-band assignment in the preceding DL OFDMA PPDU 1100 is listed fourth can use the ACK/BA sub-band with index 4 in the MU ACK frame.

In another embodiment, each STA uses one of the sub-bands among the set of sub-bands that is assigned to the STA in the preceding DL OFDMA PPDU. For instance, each STA may use the first sub-band with a given bandwidth (e.g., 2 MHz, or 4 MHz or 5 MHz) from the sub-bands that has been assigned to the STA in the preceding DL OFDMA PPDU. In another embodiment, each STA may use the first 2 MHz sub-band from the sub-bands that has been assigned to the STA in the preceding DL OFDMA PPDU. In another embodiment, each STA may use the first 4 MHz sub-band from the sub-bands that has been assigned to the STA in the preceding DL OFDMA PPDU, and if a STA has a narrower sub-band in the preceding DL OFDMA PPDU, then the STA chooses the same sub-band as in the preceding DL OFDMA sub-band. The AP can either indicate that the 2 MHz or 4 MHz sub-band designation for ACK and BA frames within a UL OFDMA PPDU, or in the preceding DL OFDMA PPDU, or broadcasted within Beacon frames, or let each STA know about such designation during association time.

Note that while the bandwidth of the UL OFDMA PPDU 1120 may be the same as the DL OFDMA PPDU 1100, the bandwidth of the UL OFDMA PPDU 1120 may be narrower than the bandwidth of the DL OFDMA PPDU 1100. For example, while a DL OFDMA PPDU 1100 has a bandwidth of 80 MHz (e.g., primary 40 MHz and secondary 40 MHz), the UL OFDMA PPDU 1120 may have a bandwidth of 40 MHz only (e.g., primary 40 MHz only). In some aspects, the AP establishes the bandwidth of the MU ACK frame in advance such that the participating STAs are notified of the bandwidth prior to formation of the MU ACK frame. In some examples, the bandwidth of the MU ACK frame may be fixed to a bandwidth of 20 MHz irrespective of the bandwidth of the DL OFDMA PPDU 1100. In other examples, the bandwidth of the MU ACK frame may be fixed to 40 MHz when the DL OFDMA PPDU 1100 has a bandwidth of 40 MHz or more.

In one or more implementations, the indication of the bandwidth for the MU ACK frame may be performed in one of the following ways: (a) the UL bandwidth may be identified by an indication to all of the STAs either in beacon frames or during association time, or (b) the UL bandwidth may be identified in each DL OFDMA frame within the HE SIG-A 702 or the HE SIG-B 704. In some implementations, where the bandwidth for all of the sub-bands assigned to ACK or BA frame have been identified to be the same, the total number of the sub-bands for ACK/BA multiplexing is given as part of the indication.

In some implementations, the AP (e.g., 210 or 211 of the AP) partitions the sub-bands for a MU ACK frame such that multiple relatively narrow sub-bands are assigned to ACK frames while multiple relatively wider sub-bands are assigned to BA frames. For example, a sub-band for an ACK frame is narrower than a sub-band for a BA frame. This is due to the fact that the ACK frame is typically shorter than a BA frame. Information relating to such partition may be announced by the AP during association time or in Beacon frames. For instance, in a MU ACK frame with 20 MHz bandwidth, the AP may assign two sub-bands (each sub-band with 4 MHz bandwidth) for BA frames, and five sub-bands (each sub-band with 2 MHz bandwidth) for ACK frames. Such partitioning may allow for more efficient MU ACK frame transmission.

In the above embodiments, the AP assigns sub-bands to the STAs (that have a payload addressed in a DL MU frame and are expected to send an ACK or BA frame in the immediately following MU ACK) in an implicit way so that the STAs place their ACK or BA frames in a unique sub-band (with no chance that another STA picks the same sub-band, hence no chance of collision). However, in the above embodiment, the bandwidth of the sub-band assignment for any ACK frame is the same as any BA frame. Since the ACK frames are typically shorter than BA frames, one outcome of assigning the same bandwidth to these frames causes the STAs that are sending an ACK frame to pad their ACK frame (where padding happens in MAC and/or PHY entities) enough so that the resulted ACK frame has the same length as the BA frame. In another embodiment, the above-mentioned indication may be altered so that different bandwidths are assigned to ACK and BA frames. Such indication may work as follows: First the AP assigns abase bandwidth that is applicable to all STAs. The base bandwidth may be assigned to a sub-field denoted as ACKBABaseBW. In this embodiment those STAs that are going to send an ACK frame use the same base bandwidth; however, those STAs that are going to send a BA frame use twice that bandwidth. For instance, the AP may set ACKBABaseBW to 2 MHz (26-tone sub-band or RU), in which case the STAs that are going to send an ACK frame can use sub-bands with 2 MHz bandwidth and the STAs that are going to send a BA frame can use sub-bands with 4 MHz bandwidth (52-tone RU). To specifically indicate this bandwidth assignment, the AP can assign a sub-field to each STA which is denoted by ACKBW. In some embodiments this sub-field is binary, where the TRUE value indicates that the STA intends to send an ACK frame, hence the STA can use a sub-band with bandwidth ACKBABaseBW. If ACKBW is set to a FALSE value, the AC/BW sub-field then indicates that the STA intends to send a BA frame, hence the STA can use a sub-band with bandwidth twice that of ACKBABaseBW. Since the ACKBW sub-field for each STA appears in the HE SIG-B field of the DL MU frame, each STA gathers the value ACKBW for all the STAs and knows what is the bandwidth used by each STA. Hence, combining that with the order of appearance of the STA sub-band info in the HE SIG-B, each STA can uniquely identify which sub-band to select in order to place its ACK or BA frame.

For instance, the MU ACK frame may have a 20 MHz bandwidth with nine sub-bands each with a 2 MHz bandwidth, or four sub-bands each with s 4 MHz bandwidth. In this example, the AP sets ACKBABW to 2 MHz, 6 STAs have payloads in the DL MU frame, and the third and fourth STAs are expected to respond with a BA frame (hence the AP sets the ACKBW sub-field for these STAs to a FALSE value), while the remaining STAs are expected to respond with an ACK frame (hence the AP sets the ACKBW sub-field for these STAs to a TRUE value). Given the above settings, and given that each STA reads the ACKBW of all the STAs, then the following is the sub-band orders that the STAs select (note that the reference of sub-bands to be chosen for ACK/BA is priori known and for instance starts from the highest-frequency sub-band or from lowest-frequency sub-band depending on implementation):

The first STA whose sub-band info appears in the HE SIG-B field chooses the first 2 MHz sub-band (given that ACKBW is set to TRUE)

The second STA whose sub-band info appears in the HE SIG-B field chooses the second 2 MHz sub-band, given that ACKBW is set to TRUE, and prior ACKBW values are: TRUE The third STA whose sub-band info appears in the HE SIG-B field chooses a 4 MHz sub-band (i.e., the third and fourth 2 MHz sub-band), given that ACKBW is set to FALSE, and prior ACKBW values are: TRUE, TRUE The fourth STA whose sub-band info appears in the HE SIG-B field chooses a 4 MHz sub-band (i.e., the fifth and sixth 2 MHz sub-band), given that ACKBW is set to FALSE, and prior ACKBW values are: TRUE, TRUE, FALSE The fifth STA whose sub-band info appears in the HE SIG-B field chooses a 2 MHz sub-band (i.e., the seventh 2 MHz sub-band), given that ACKBW is set to TRUE, and prior ACKBW values are: TRUE, TRUE, FALSE, FALSE The sixth STA whose sub-band info appears in the HE SIG-B field chooses a 2 MHz sub-band (i.e., the eighth 2 MHz sub-band), given that ACKBW is set to TRUE, and prior ACKBW values are: TRUE, TRUE, FALSE, FALSE, TRUE.

In above, each prior TRUE value of ACKBW counts as one (order of sub-bands with ACKBABW=2 MHz) and each prior FALSE value of ACKBW counts as two (order of sub-bands with ACKBABW=2 MHz, e.g., twice that bandwidth hence 4 MHz).

In the above embodiment, ACKBW is a binary sub-field and takes two values. However, in general, ACKBW may take more than two values. For instance, a 2-bit representation of ACKBW may be structured as follows: value 00 indicates that there is no sub-band assigned to the DL payload, value 01 indicates that the sub-band assigned to the DL payload has the same bandwidth as indicated in ACK-BABW, value 10 indicates that the sub-band assigned to the DL payload has twice the bandwidth as indicated in ACK-BABW, and value 11 indicates that the sub-band assigned to the DL payload has three times the bandwidth as indicated in ACKBABW, Similar to the example described above, each STA that has a payload may determine its sub-band by observing the ACKBW values for all the STAs whose DL payload has been indicated earlier in the HE SIG-B of the DL MU frame. Note that the value 00 for ACKBW as described above is used when the ACK Policy field in the QoS control field in a DL payload is set to "No Ack" or "Block Ack."

With respect to FIGS. 7-11, it is possible to convey the necessary information for carrying the information for ACK/BA responses for all STAs in a separate frame that is assigned to a sub-band. Such frame is denoted as a Trigger frame and it has information such as: the duration of the MU ACK (or the multiplexed ACK/BA responses as shown in FIGS. 7-11), the sub-band assignments for each of the payloads, the MCS/NSS for each of the STAs, etc). The presence of a Trigger frame may be indicated in HE SIG-A or HE SIG-B as well as the sub-band of the Trigger frame. All the STAs that have a payload in the DL MU frame first decode and interpret HE SIG-A and HE SIG-B and find out whether there is a Trigger frame and then the STAs process and decode their own payload (as indicated in HE SIG-B) as well as the Trigger frame. Then the STAs find out from the Trigger the above-mentioned details that they need in order to multiplex their ACK or BA frame in the subsequent MU ACK frame. In some embodiments, as long as the AP indicates there is a Trigger frame inside the DL MU frame, all the STAs that have captured the DL MU frame can process and decode the Trigger frame and can find out whether there is any assignment for the STA. This means that a STA that has a DL payload can process and decode the Trigger frame (in which case the Trigger frame indicates the information to multiplex their ACK/BA response), as well as the STAs that do not have payloads can process and decode the Trigger frame which case the Trigger frame indicates the information to multiplex a data, management, or control frame).

Figure 12:
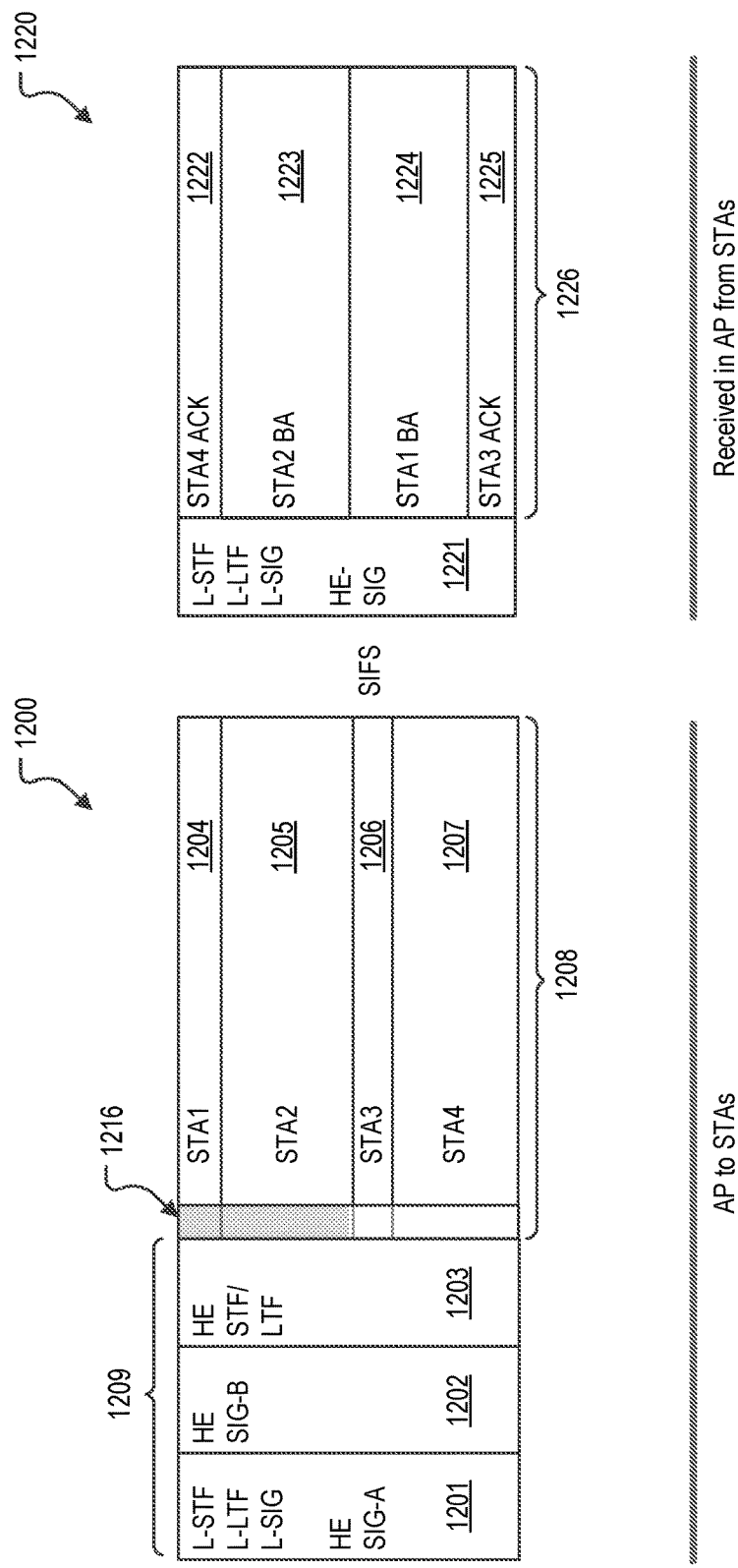
FIG. 12 illustrates a schematic diagram of an example of a downlink frame and an uplink frame, where the downlink frame has a trigger frame in a payload of the downlink frame.

FIG. 12 illustrates a schematic diagram of an example of a downlink frame with a trigger frame in a payload of the downlink frame and an uplink frame. In this case, a DL OFDMA PPDU 1200 includes a header section 1209 comprised of the legacy PLCP 1201 (including the HE SIG-A), the HE SIG-B 703 and the HE STF/LTF 704. The payload section 1208 contains multiple PSDU payloads where PSDU 1204 is associated with STA1, PSDU 1205 is associated with STA2, PSDU 1206 is associated with STA3 and PSDU 1207 is associated with STA4. Here, each of the PSDUs 1205 and 1207 has a sub-band that is larger than the sub-band of each of the remaining PSDUs 1204 and 1206.

The UL OFDMA PPDU 1220 includes a legacy PLCP 1221 (with the HE SIG symbol) and a payload section 1226. The payload section 1226 includes multiple ACK/BA payloads where BA payload 1224 is associated with STA1. BA payload 1223 is associated with STA2, ACK payload 1225 is associated with STA3 and ACK payload 1222 is associated with STA4. In this example, each of the ACK payloads 1222 and 1225 has a sub-band with a bandwidth that is smaller than the sub-band bandwidths of each of the BA payloads 1223 and 1224.

In some embodiments, the above-mentioned Trigger frame appears in the same sub-band as the DL payload (e.g., as an MPDU within the AMPDU) where the Trigger frame is essentially a single-STA Trigger frame. The Trigger frame provides the above-mentioned information (e.g., the duration and the sub-band assignment, etc. for the same STA that has the payload in that DL sub-band. In some embodiments, the Trigger frame (e.g., 1216) appears as the first MPDU inside the A-MPDU after which the data/management MPDU follows. In FIG. 12, the Trigger frame/MPDU is shown as a gray box inside each DL payload in each sub-band. The Trigger frame may identify one or more resource units (or sub-bands) assigned to each of the STAs for transmitting its uplink frame. A STA (e.g., STA1) that receives and processes the DL MU frame (e.g., 1200) may determine whether there is a payload in a sub-band destined to the STA (e.g., 1204). The STA first decodes the Trigger frame (e.g., 1216) and when it obtains the content of the Trigger frame, the STA prepares for sending the ACK or BA (e.g., BA 1224) or any other appropriate response frame in the sub-band that is indicated in the Trigger frame (and according to other properties mandated by the Trigger frame such as the duration/length of the ACK/BA frame). Then the STA processes and decodes the remaining MPDUs in the payload (e.g., 1204). As described herein, the Trigger frame may thus include scheduling information for a PPDU that carries an immediate acknowledgment. Note that in some embodiments, the STA may perform above-mentioned processing in parallel.

In some aspects, if a BA frame (e.g., 1223, 1224) is sent as an immediate response to either an implicit BA request that was carried in an HE OFDMA PPDU (e.g., 1200), the MU ACK frame (that contains the BA frame) can be carried in a HE PPDU with the setting as described above. The rate and bandwidth of the BA is selected as described above using CODING, MCS, GI parameters of the RXVECTOR parameters of the HE DL OFDMA PPDU in order to set CODING, MCS, GI parameters of the TXVECTOR parameters of the MU ACK frame.

In some aspects, if an ACK frame (e.g., 1222, 1225) is sent as an immediate response to either an implicit BA request that was carried in an HE OFDMA PPDU (e.g., 1200), the MU ACK frame can be carried in HE PPDU with the setting as described above. The rate and bandwidth of the BA is selected as described above using CODING, MCS, GI parameters of the RXVECTOR parameters of the HE DL OFDMA PPDU to set CODING, MCS, GI parameters of the TXVECTOR parameters of the MU ACK frame.

While receiving an MU ACK frame transmitted in the HE PPDU format with details described above, the AP (e.g., 210 or 211 of the AP) uses the RXVECTOR parameter SUBCARRIERS_LIST to identify which STA has responded with ACK and BA frames. The MAC entity (e.g., the MAC processor 211 or the MAC software processing unit 212 and/or the MAC hardware processing unit 213 of the MAC processor 211) compares the RXVECTOR parameter SUBCARRIERS_LIST with the TXVECTOR parameter SUBCARRIERS_LIST of the preceding HE OFDMA PPDU and identifies which of the STAs has participated in forming the MU ACK. Specifically for ACK frames, the AP does not know which STA has sent the ACK frame since there is no TA field in the received ACK frame (e.g., ACK frame only has RA address). However, in some embodiments where the SUBCARRIERS_LIST of the TX VECTOR of a HE OFDMA PPDU and the SUBCARRIERS_LIST of the TXVECTOR of the immediately following MU ACK are the same for each STA that receives a payload in the HE OFDMA PPDU and participates in forming the MU ACK frame, the AP can compare to verify the presence of the SUBCARRIERS_LIST in the RX VECTOR of the received MU ACK frame. If the BA or ACK frame is not present in the given SUBCARRIERS_LIST of the received MU ACK frame, the AP infers that the STA with the given SUBCARRIERS_LIST (in the DL OFDMA and MU ACK exchange) has not sent an ACK or BA frame. If a BA or ACK frame is present in the given SUBCARRIERS_LIST of the received MU ACK frame, and if the frame is an ACK frame, then the AP can further infer which STA has sent the ACK frame (see FIG. 10).

While receiving an MU ACK frame transmitted in the HE PPDU format with details described above, an AP transfers a payload (DATA) from a PHY to a local MAC entity with the below PHY-DATA.indication primitive. The primitive provides the following parameter: PHY-DATA.indication, (DATA, USER_INDEX). The DATA parameter may be an octet of value X'00' to X'FF'. The USER_INDEX parameter (typically identified as u for a HE STA) is present for a HE UL OFDMA PPDU or a HE UL MU PPDU, and indicates the index of the user in the RXVECTOR to which the accompanying DATA octet applies. Otherwise, USER_INDEX parameter is not present. The PHY-DATA.indication primitive is generated by a receiving PHY entity (e.g., the PHY processor 215 or the RX signal processing unit 290 of the PHY processor 215) to transfer the received octet of data to the local MAC entity. The time between receipt of the last bit of the last provided octet from the WM and the receipt of the PHY-DATA.indication primitive by the MAC entity is aRxPHYDelay. The effect of receipt of this primitive by the MAC is unspecified.

Figure 13:
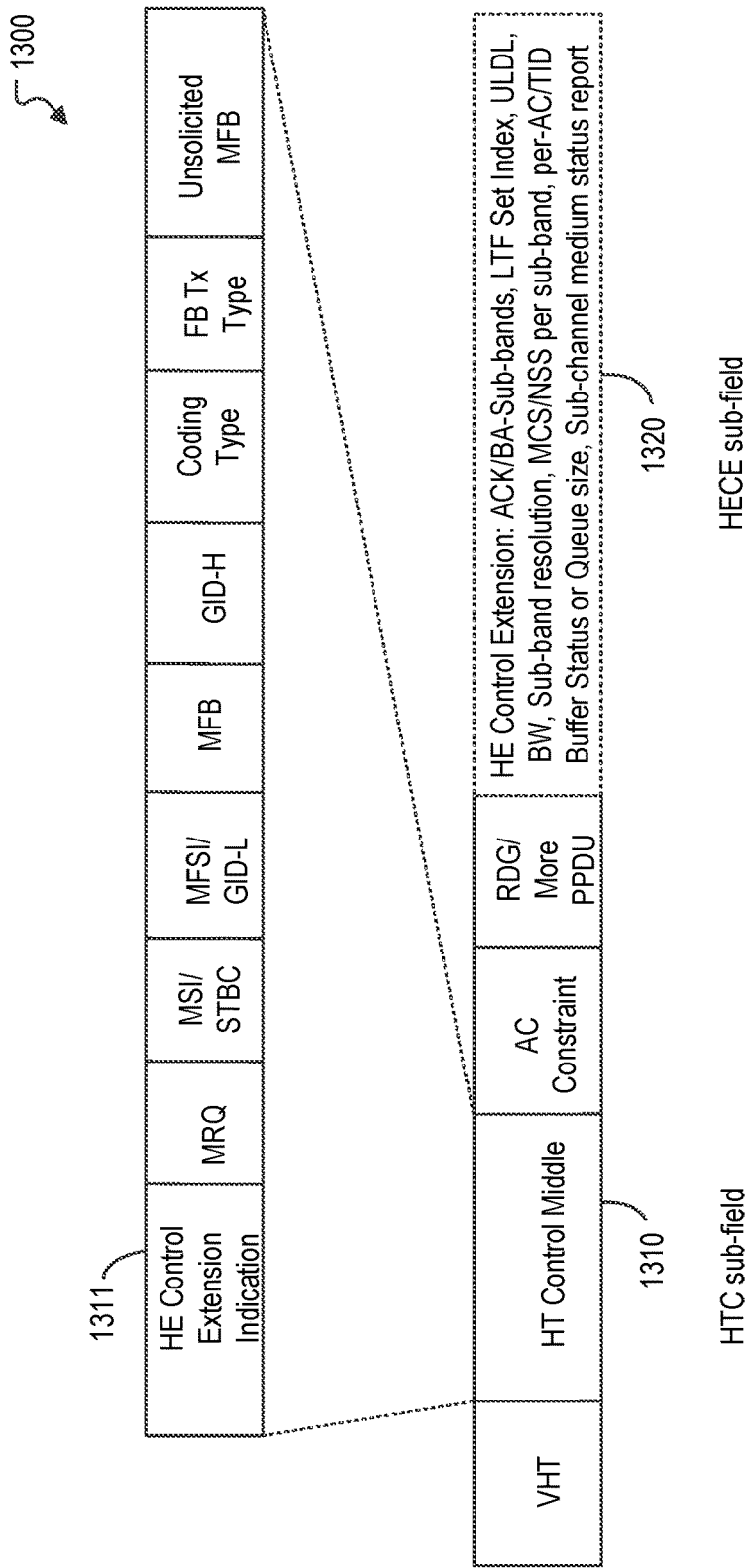
FIG. 13 illustrates an example of a control field of a data frame.

FIG. 13 illustrates an example of an extended control field 1320 in a HT control field 1300 of a data frame. For convenience, the extended control field 1320 is sometimes referred to as an HE Control extended subfield/field or an HE control subfield/field.

In some embodiments, an AP may use the QoS control field in the MAC header of each MPDU and an extended HT control field (denoted as HE Control Extension (HECE) in the HT control field) in a DL payload to notify a STA (that has a payload in the DL MU frame) about the sub-band that the STA can use to place its ACK or BA frame in the immediately multiplexed-ACK/BA frame. As described herein, the HT control field 1300 may be located in a MAC header of a trigger MPDU within a payload of a multi-user downlink frame (e.g., DL OFDMA PPDU or DL MU MIMO PPDU). In some aspects, the trigger MPDU is a control frame that carries the HT control field 1300 in a payload of the trigger MPDU. In other aspects, the HT control field 1300 is a High Efficiency control field within the MAC header of the trigger MPDU.

In one or more implementations, a STA may use both the QoS control field and the HT control field 1300 (having the HECE subfield 1320) to convey information relating to the queue size and/or frequency selectivity status of the STA to its associated AP. The HT control field 1300 may include a HE control extension indication (HECEI) field 1311, which may be located in an HT control middle section 1310 of the HT control field 1300. The HT control field 1300 includes the HECE subfield 1320.

Still referring to FIG. 13, in one aspect, if the HECEI field is set to one, then the HECE subfield 1320 exists; otherwise the HECE does not exist. In one or more implementations, the HECE subfield 1320 carries one or more of the following information: ACK/BA sub-band, LTF Set Index, ULDL, bandwidth, sub-band resolution, length information, MCS and NSS per sub-band (or per each of the sub-bands with the mentioned sub-band resolution), buffer-status or queue size per TID, or alternatively, buffer-status or queue size per AC, quality indicator of the full-hand or sub-bands, and sub-channel medium status report. The HECE subfield 1320 may also include an identification subfield to indicate what subset of the listed subfields in 1320 are carried in a specific instance of an HECE in a frame. For each payload in a DL MU frame, an AP may use HECE in the MAC header and fill the designated "ACK/BA sub-band(s)" field with the sub-band(s) that the STA may use to send its ACK or BA frame. The "ACK/BA sub-band(s)" field in HECE may be interpreted as follows: it is present in MAC headers of the MPDUs that are conveyed in a DL MU PPDU. If present, it indicates the sub-band or sub-bands that the AP assigns to the STA in order to place its ACK/BA frame in the multiplexed or MU ACK/BA frame in uplink direction. A subband may be referred to as a resource unit. An AP may schedule which STAs to use which sub-bands; hence, an AP may provide uplink multi-user response scheduling information. As described herein, the HECE subfield 1320 may include scheduling information for a trigger-based PPDU that carries an immediate acknowledgment. Note that the HECE sub-field 1320 may have additional sub-fields such as "Number of sub-bands," where collectively these sub-fields explicitly identify all the sub-bands that the STA intends to use to place its ACK/BA frame in the UL multiplexed ACK/BA frame. The "sub-channel medium status report" in the HECE subfield 1320 indicates the status of each of the 20 MHz sub-channels that the STA senses before sending a frame that carries the HT control field 1300 and HECE subfield 1320 (or a response frame to an eliciting frame that may request the sub-channel medium status). The frame may occupy the Primary 20 MHz channel, or it may occupy a sub-band or RU within a 20 MHz sub-channel (in an UL MU PPDU). Depending on the immediately preceding frame that elicits the response frame and the bandwidth of the eliciting frame, the STA may perform carrier sensing (CS) or energy detection (ED) on one or more 20 MHz sub-channels that the eliciting frame occupies after which the STA reports the medium status of each of the sensed 20 MHz sub-channels within the HECE subfield 1320 of the response frame. The medium status report may indicate whether the medium is IDLE or BUSY as defined in an IEEE 802.11 specification, or may indicate whether the signal or energy that is sensed in each 20 MHz sub-channel is less than a specified threshold (e.g., an OBSS_PD threshold, or one or more thresholds indicated in the eliciting frame, for instance one or more thresholds from the set of {−82 dBm, −72 dBm, −62 dBm, . . . }). In an embodiment, one or more sub-channel medium status reports may be reported for each 20 MHz sub-channel, where each report corresponds to a predetermined threshold (e.g., a report indicates whether the signal or energy that is sensed in a 20 MHz sub-channel is less than a first threshold and another report indicates whether the signal or energy that is sensed in the same 20 MHz sub-channel is less than a second threshold. In another embodiment, the basis for sub-channel medium status might be a narrower or wider bandwidth than 20 MHz, either as a pre-determined bandwidth basis, or as an indicated bandwidth basis in the eliciting frame. In another embodiment, the basis for sub-channel medium status report is Primary 20 MHz, Primary 40 MHz, Primary 80 MHz, and Secondary 80 MHz where a STA reports the status of one or more of these sub-channels. In an example, an AP may send a trigger frame to a set of STAs. Within the trigger frame the AP may request each STA to send its buffer status in the following UL MU PPDU and/or the AP may request each STA to send sub-channel medium status. Each responding STA then sends its buffer status (per AC or per TID or for all TIDs) in a HE Control (HEC) field of the response frame and/or sends the sub-channel medium status (for each 20 MHz sub-channel) within the same HEC field or in an HEC field of another MPDU within the same response frame (or both reports carried in the HEC field of a QoS Null frame). In an embodiment, a responding STA may send unsolicited sub-channel medium status (for each 20 MHz sub-channel) within the HEC field of an MPDU of the same response frame (or carried in HEC field of a QoS Null frame). In above example, the AP uses the sub-channel medium status reports from each STA to schedule the upcoming DL SU or MU frames or UL MU frames. In an embodiment, the AP does not schedule any DL payload or schedule any UL transmission on one or more 20 MHz sub-channels for a STA, if the STA indicates unfavorable medium status in those sub-channels (e.g., if the report indicates a BUSY status, or if the STA indicates the energy level on the sub-channels is larger than a specified threshold).

As indicated above, length information may be indicated in the HECE subfield 1320. This length information may be utilized by the receiving STA to indicate the length of the response frame (e.g., the UL MU frame). For example, in one or more implementations, a L_LENGTH parameter in the TXVECTOR parameter associated with the MU ACK frame is set to a corresponding value indicated in a MUACK-L-LENGTH parameter of a HE control field of the immediately preceding DL PPDU. In one aspect, L_LENGTH is a length of a PSDU of a UL OFDMA PPDU. In some aspects, the L_LENGTH parameter in the TXVECTOR parameter associated with the MU ACK frame is set to a value corresponding to MUACKMaxLength. In one or more implementations, the MUACKMaxLength is a fixed value calculated based on a maximum possible length of a BA frame when modulated with MCS0 (e.g., BPSK at coding rate of ½) or MCS1 (e.g., QPSK at coding rate of ½). In some aspects, an AP announces the parameter MUACK-MaxLength during association.

Note that one or more of the above-identified subfields in the HECE subfield 1320 are optional, or may appear based on some indication. Depending on an indicator that appears at a given location, e.g., the beginning of the HECE subfield 1320, the reported parameters in the remaining portion of the HECE subfield 1320 is indicated, e.g., the HECE subfield 1320 includes a subset of the attributes listed above. For example, with a reserved value appearing in the indicator, the queue size and/or buffer status per AC or all ACs is reported in the HECE subfield 1320. In another example, with another reserved values appearing in the indicator, an additional indication of the queue size per AC or per TID is reported in the HECE subfield 1320. In another example, with another reserved value appearing in the indicator, MCS, NSS or some quality indicator (such as SNR or RSSI) is reported in the HECE subfield 1320. In another example, with another reserved value appearing in the indicator, duration or sub-band assignment of a subsequent response frame is reported in the HECE subfield 1320. Accordingly, the indicator value in the HECE subfield 1320 indicates the parameters in the HECE subfield 1320.

When the ULDL, subfield in the HECE subfield 1320 is set to one, the indicated values for the MCS and NSS per sub-band in the HECE subfield 1320 are values that the STA intends to employ for each specified sub-band in the next (or one or more subsequent) UL OFDMA PPDUs or UL MIMO PPDUs.

The values provided in the HECE subfield 1320 may be used when an STA intends to participate in forming an upcoming UL OFDMA PPDU or UL MU MIMO PPDU, and the STA intends to notify the AP on which MCS and NSS values are intended to be used in the specified sub-bands provided that the AP creates an assignment for the STA in any of the sub-bands. In this case, the MCS and NSS values may be used by the AP in creating the STA assignment, sub-band assignment, and spatial-stream (SS) assignment of the one or more subsequent UL OFDMA PPDUs or UL MIMO PPDUs. In some aspects, if the AP assigns more than one sub-band with the specified resolution to the STA in the next UL OFDMA PPDU or UL MU MIMO PPDU, then the STA may use the more robust MCS and NSS values across two or more sub-bands.

When the ULDL subfield in the HECE subfield 1320 is set to zero, the indicated values in the HECE subfield 1320 are recommended values directed to the MCS and NSS or some other quality indicators (such as RSSI or SNR) per sub-band for the AP to use in the next (or one or more subsequent) DL OFDMA PPDUs. For example, the MCS and NSS values may be a recommendation to the AP on which MCS or NSS values to use for the next DL OFDMA or DL MU MIMO PPDUs. The recommendation of the MCS and NSS values may be interpreted by the AP as solicited or unsolicited values by the AP, depending on the other subfields in the HT control field 1300. In some aspects, the AP may determine not to include the STA in a next (or one or more subsequent) UL MEMO PPDU or UL OFDMA PPDU based on information reported in the HECE subfield 1320, particularly with respect to the MCS, NSS and/or queue size values, irrespective of the ULDL value.

In some embodiments, in the MU (or multiplexed) ACK/BA frame that immediately follows a DL MU PPDU, the AP that sends the DL MU PPDU may not assign all the sub-bands to the expecting ACK/BA frames. When the AP leaves some sub-bands unassigned, the AP identifies the unassigned sub-bands in the HE SIG-B of the DL MU PPDU, along with some other attributes of the MU ACK/BA frame such as its duration. Other STAs that have received the DL MU PPDU and decoded the HE SIG-B section of the frame successfully can realize what sub-bands are going to be available in the upcoming MU ACK/BA frame that immediately follows the DL MU PPDU. These STAs can be allowed to send control/management frames (such as Uplink-Request frame, PS-Poll frame, or even a delayed BA from an earlier exchange with AP) or data frame (which may be a QoS null frame that carries queue size and may have the HECE sub-field 1320) in the unassigned sub-band only if the duration of the frame fits the specified duration of the MU ACK/BA frame.

In other embodiments, the AP that sends the DL MU PPDU may not assign all the sub-bands to the expecting ACK/BA frames and some sub-bands may be assigned to other STAs from which the AP expects to receive a frame (this may be based on prior exchanges the AP had with the STA, based on which the AP expects a short data frame or some control or management frames from the STA). The AP indicates the unassigned sub-bands in the HE SIG-B of the DL MU PPDU, along with some other attributes of the MU ACK/BA frame such as the AID/PAID of the STA assigned with a sub-band by the AP, the duration of the MU ACK/BA frame, etc. The STA whose AID/PAID appears in an MU ACK/BA frame (but did not have a DL payload in the immediately preceding DL MU frame) can be allowed to send control/management frames (such as Uplink-Request frame, PS-Poll frame, or even a delayed BA from an earlier exchange with AP) or data frame (which may be a QoS Null frame that carries queue size and may have the HECE sub-field 1320) in the assigned sub-band only if the duration of the frame fits the specified duration of the MU ACK/BA frame.

It some embodiments, an MU ACK is invoked for frames other than DL MU frames. For instance, a MU ACK response may be invoked as a response to a frame that is sent as multicast frame where multiple STAs receive the same payload from another STA, e.g., an AP. In such cases, while the DL payload is the same for all (hence the reason sent in multicast format), the STAs may each have a different experience on whether they have decoded the MPDU or MPDUs successfully. While it is more robust if each STA sends its ACK and BA frames in response to multicast frames, it is more efficient if the STAs multiplex their ACK or BA frames with the same principle as described above. Note that since the payload for all the STAs that receive a multicast frame is the same, hence it is expected that either all the STAs respond with ACK frame (if the multicast payload has only one MPDU) or all the STAs respond with BA frame (if the multicast payload has multiple MPDUs).

In some embodiments, after a multicast frame, a MU block acknowledgment request (BAR) frame follows where the AP identifies the list of STAs that expects an acknowledgment response, and assigns to each STA a sub-band to be used for multiplexing their ACK or BA response. Note that the list of STAs identified in the MU BAR may include all the STAs that belong to the multicast group, or may include a subset of the STAs that belong to the multicast group. A sub-band may be referred to as a resource unit. In one or more embodiments, multicast transmission may be associated with group-cast with retry (GCR) service, and a multicast group may refer to a GCR group.

In some embodiments, after a multicast frame, a MU BAR frame follows where the AP identifies the list of STAs that expects an acknowledgment response. Note that the list of STAs identified in the MU BAR may include all the STAs that belong to the multicast group, or may include a subset of the STAs that belong to the multicast group. The AP also identifies the bandwidth (in a field denoted by AcknowledgmentBW) that can be used for multiplexing the ACK or BA response. In this embodiment, the AP does not identify the specific sub-bands for each STA. Rather, given the value of AcknowledgmentBW, each STA is implicitly assigned with a sub-band (among all the sub-bands with bandwidth AcknowledgmentBW) that has the same order as the order of the STA in the above-mentioned list of the STAs (e.g., if the identification of the STA appears in the nth order in the list of the STAs in the MU BAR frame, then the STA chooses the sub-band with bandwidth AcknowledgmentBW that has the order 'n').

In some embodiments, after a multicast frame, the MU ACK frame (or multiplexed ACK frames or multiplex BA frames) follow after an IFS interval. In such embodiments, the multicast group that has been announced by the AP has an inherent order of the STAs. Such inherent order is used to assign the sub-bands to individual STAs for multiplexing their ACK/BA response (in a similar manner as explained above). However, the AP identifies the bandwidth that can be used for multiplexing the ACK or BA response (denote this parameter by MulticastACKBW), where the value of MulticastACKBW may be a priori known to the STAs that belong to a multicast group, e.g., during the announcement of the multicast group. Alternatively, the AP may announce a fixed MulticastACKBW value for all multicast groups (either within the Beacon frame or during association).

In some of the above embodiments, after a multicast frame that has a single MPDU (whether a MU BAR frame is present or not), a MU ACK frame may follow that is multiplexed with several ACK frames. Note that the STAs that have not decoded the multicast payload correctly may not send an ACK frame. The AP (the sender of the multicast payload) can conclude from the presence of an ACK frame in a given sub-band whether a STA has sent the ACK frame. In some of the above embodiments, after a multicast frame that has multiple MPDUs (whether a MU BAR frame is present or not), a MU ACK frame may follow that is multiplexed with several BA frames.

In some embodiments, the MU BAR frame has the same structure as an 802.11-based BlockAckReq frame or Multi-TID BlockAck frame but with the following differences: (a) If Multi-TID BlockAck frame is used, the "Per-TID info" has the identification of each STA (AID or PAID) that is expected to respond. In some embodiments, this field is the only field present in each "BAR Information field." In some of the above embodiments where the identification of STAs is not included in a MU BAR frame, the 802.11-based BlockAckReq frame is used, (b) The "BAR Control" field includes AcknowledgmentBW, (c) The "BAR Control" field may include an identification of the multicast group, denoted by MulticastID, (d) The "BAR Control" field includes "Block ACK starting sequence control." Note that "Block ACK starting sequence control" applies to all the STAs that are expected to respond with a BA frame hence it is present in "BAR Control" instead of each "BA Information field"). Not that in the above embodiments, the "BAR Control" field may have 2-4 octets length in order to accommodate AcknowledgmentBW, MulticastID, and "Block ACK starting sequence control" fields. A frame with the above fields may be denoted as Multicast BAR and may be assigned a new frame sub-type in the MAC header. The RA address of such frame is set to Broadcast address. In the above embodiments, the "BAR ACK Policy" in the "BAR Control" field is set to a FALSE value, which means that the STAs do not set an acknowledgment to the BAR frame. In the above embodiments, the "Multi-TID" bit in the "BAR Control" field may be a reserved field. In some embodiments where the same BAR frame with the same sub-type is used, the Multi-TID bit may be set to a TRUE value to indicate that the BAR frame is a MulticastBAR frame.

Figure 14:
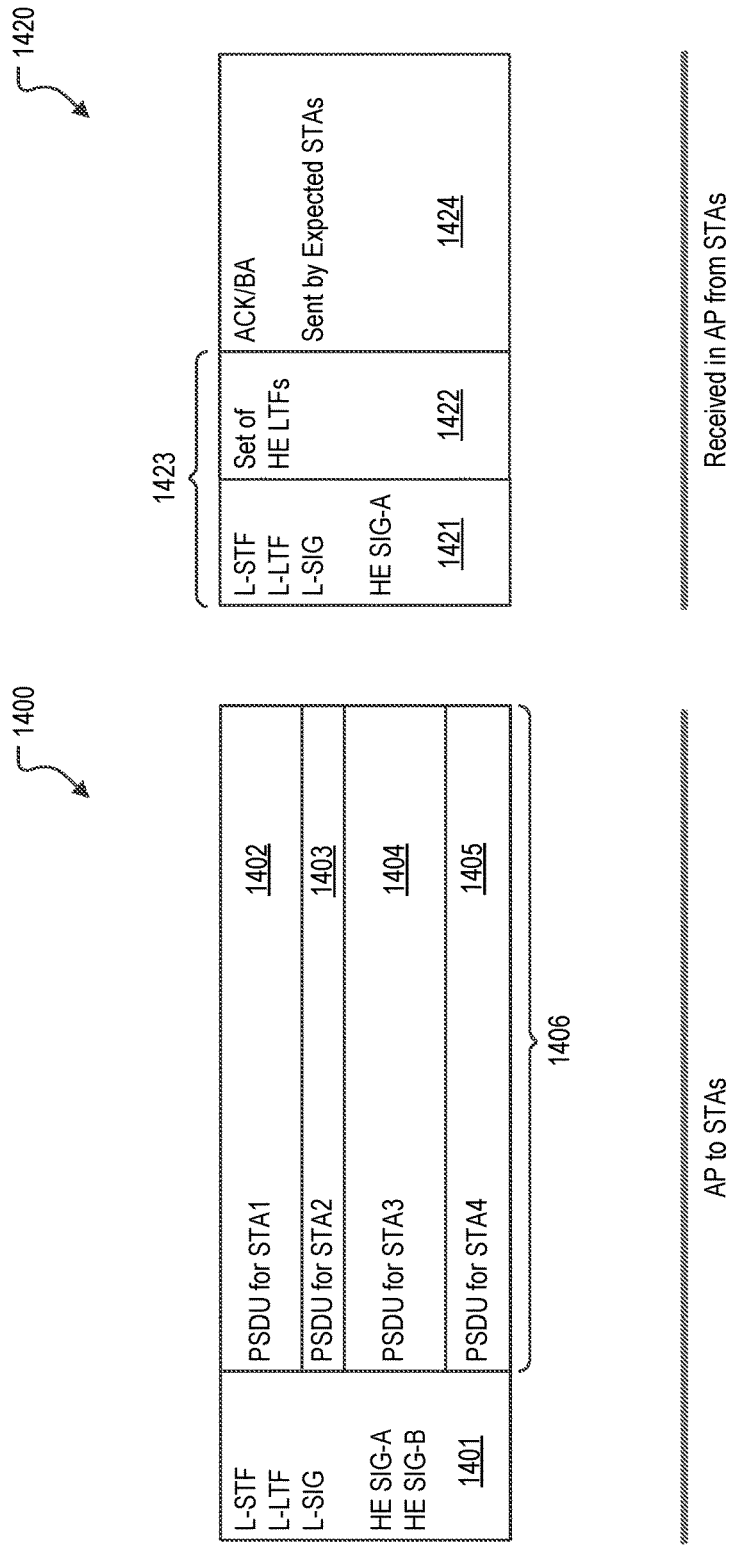
FIG. 14 illustrates a schematic diagram of an example of a downlink OFDMA frame and an uplink MU frame from a set of stations.

FIG. 14 illustrates a schematic diagram of an example of a downlink OFDMA frame 1400 and an uplink MU frame 1420 (or MU ACK frame) from a set of STAs. A similar exchange as in FIG. 7 is illustrated in FIG. 14 except that the STAs that receive payloads in the DL OFDMA PPDU 1400 send an UL MU PPDU. FIG. 7 shows that the MU ACK frame is sent in UL OFDMA format where FIG. 14 shows that the ACK frames are sent in UL MU MIMO format where there are restrictions on the number of spatial streams that each STA uses in the MU ACK frame (more details explained below). Note that in the HE SIG A or HE SIG-B part of the DL OFDMA frame 1400, the AP indicates whether the ACK/BA frames can be multiplexed with UL OFDMA format or UL MU format.

In FIG. 14, a DL OFDMA transmission is followed by a PPDU that includes ACKs and/or BAs in the UL MU MIMO format from the STAs that have a payload in the DL OFDMA frame 1400, where their ACK policy field in the QoS control field is set to 00 or "Normal Ack or Implicit Block Ack Request." First, an AP transmits a DL OFDMA PPDU (e.g., 1400) in a HE PPDU format. The HE PPDU format is composed of a header 1401 having the Legacy PLCP, the HE PLCP (e.g., HE SIG-A, HE SIG-B) and the PSDU (e.g., 1401). The AP transmits the payloads through sub-bands of possibly varying bandwidth, and possibly non-contiguous hands for a given STA. After the SIFS from receiving the DL OFDMA PPDU, all the STAs that have their ACK Policy field in the QoS control field is set to 00 or "Normal Ack or Implicit Block Ack Request," transmit their ACK or BA frames simultaneously in UL MU MIMO format, which collectively is called MU ACK. The MU ACK frame (e.g., 1420) is composed of the Legacy PLCP (e.g., 1421) including the HE SIG-A symbol, which is transmitted by all the STAs that participate in forming the MU ACK, and the PSDU (e.g., 1424). Since the ACK/BA frames are sent in the UL MU MIMO format, there are some restrictions on the number of spatial streams (SS) that each STA can use, which are explained below. Note that in the HE SIG A or HE SIG-B part (e.g., 1401) of the DL OFDMA frame 1400, the AP indicates whether the ACK/BA frames can be multiplexed with a UL OFDMA format or a UL MU format.

Figure 15:
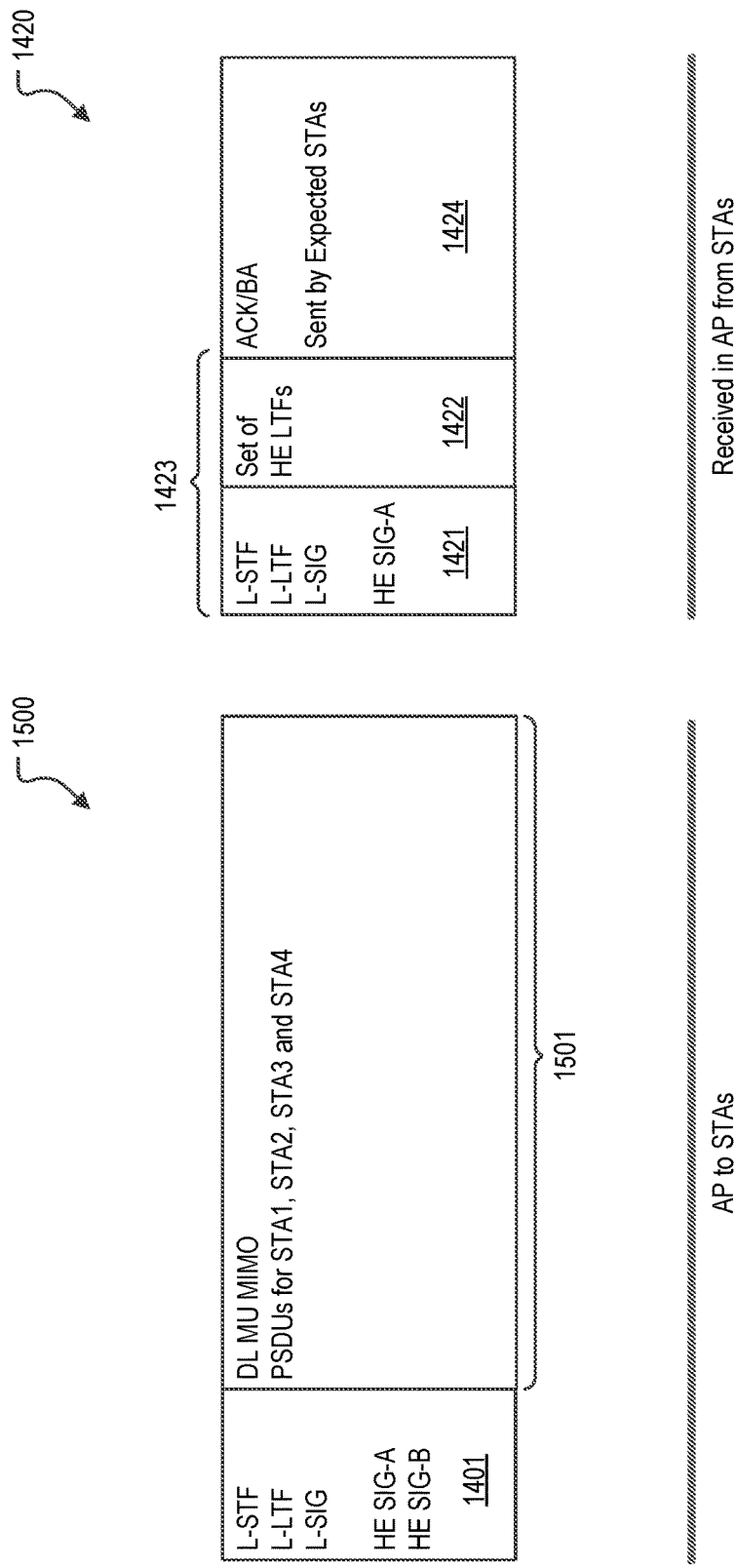
FIG. 15 illustrates a schematic diagram of an example of a downlink MU frame and an uplink MU frame from a set of stations.

FIG. 15 illustrates a schematic diagram of an example of a downlink frame 1500 and an uplink frame 1420 for a multiuser exchange among WLAN devices. A similar exchange as in FIG. 14 is illustrated in FIG. 15 except that the downlink transmission has a DL MU MIMO format.

FIG. 15 illustrates a DL, MU MIMO transmission which is followed by a PPDU that includes ACKs and/or BAs in the UL MU MIMO format from the STAs that have a payload in the DL MU MIMO frame 1500, where their ACK Policy field in the QoS control field is set to 00 or "Normal Ack or implicit Block Ack Request," First, an AP transmits a DL MU MIMO frame (e.g., 1500) in a HE PPDU format. The HE PPDU format is composed of a header 1401 having the Legacy PLCP, the HE PLCP (e.g., HE SIG-A, HE SIG-B) and the PSDU (e.g., 1501). After the SIFS from receiving the DL MU MIMO PPDU 1500), all the STAs that have their ACK policy field in the QoS control field set to 00 or "Normal Ack or Implicit Block Ack Request," transmit their ACK or BA frames simultaneously in the UL MU MIMO format, which collectively is called a MU ACK. The MU ACK frame (e.g., 1420) is composed of the Legacy PLCP (e.g., 1421) including the HE SIG-A symbol, which is transmitted by all the STAs that participate in forming the MU ACK, and the PSDU (e.g., 1424). Particularly, the MU ACK frame in the UL MU MIMO format has several HE LTF symbols that are denoted as "Set of LTFs" and are explained below. Since the ACK/BA frames are sent in the UL MU MIMO format, there are some restrictions on the number of spatial streams (SS) that each STA can use, which are explained below. Note that in the HE SIG A or HE SIG-B part (e.g., 1401) of the DL MU MIMO frame 1500, the AP indicates whether the ACK/BA frames can be multiplexed with the UL OFDMA format or the UL MU format.

In forming the MU ACK frame (e.g., 1420), the partial HE PLCP part of the frame which consists of HE SIG-A, if present, is formed as with FFT size 64 for the bandwidth of 20 MHz. If the immediately preceding DL OFDMA PPDU (e.g., 1500) has 40 MHz, then the partial HE PLCP part can have two identical parts with total bandwidth of 40 MHz. If the immediately preceding DL OFDMA PPDU has 80 MHz, then the partial HE PLCP part can have four identical parts with total bandwidth of 40 MHz. If the immediately preceding DL OFDMA PPDU has 160 MHz or 80+80 MHz, then the partial HE PLCP part can have eight identical parts with total bandwidth of 160 MHz. The encoding of different fields of the SIG-A part can be with the same values that has been indicated in the immediately preceding DL OFDMA frame Particularly, all the parameters in the TXVECTOR that relate to the HE SIG-A are set to values that are a priori known but the parameter CH_BANDWIDTH in the TXVECTOR is set to the same value as in CH_BANDWIDTH in the RXVECTOR of the immediately preceding DL OFDMA PPDU. In other embodiments, the fields in HE SIG-A are encoded with a fixed value that the AP announces, or fixed values such that all the STAs that participate in forming the MU ACK frame can use identical values for all of the fields in the HE SIG-A symbols. In some other embodiments, only the first symbol of the HE SIG-A symbols, sometimes known as HE SIG-A1, is only present in the partial HE PLCP in the MU ACK frame.

In forming the PSDU part of an MU ACK frame, a STA can set the TXVECTOR parameter GI_TYPE of a MU ACK frame carried in the HE PPDU format (with partial PLCP or preamble header as described above) to the RXVECTOR parameter GI_TYPE of a frame eliciting the response. In other embodiments, a STA can set the TXVECTOR parameter GI_TYPE of a MU ACK frame carried in the HE PPDU format (with partial PLCP or preamble header as described above) to the LONG_GI (for the FFT size of 256, the LONG_GI may have values such as 1.6 μs or 3.2 μs).

In forming the PSDU part of an MU ACK frame, a STA may set the TXVECTOR parameter FORMAT to HE, set the TXVECTOR parameter N_TX to one, and set the TXVECTOR parameter FCC_CODING to BCC_CODING. The STA also may set the TXVECTOR parameter MCS to value 0 (or MCS0). In other embodiments, a STA may set the TXVECTOR parameter MCS to the value of a MUACK-MCS parameter that has been indicated by the AP in the immediately preceding DL OFDMA frame (e.g., 1400). The MUACK-MCS parameter is indicated in the MUACK-MCS field of the HE control field of the immediately preceding DL OFDMA frame (e.g., 1400). In other embodiments, the MCS parameter in the TXVECTOR of the MU ACK frame can be set to the parameter MUACKMCS. The AP announces the parameter MUACKMCS during association, or in Beacon frames. In other embodiments, the parameter MUACKMCS is set to a fixed value a priori, such that all the STAs that participate in forming the MU ACK frame can use identical values for this parameter.

In the embodiments, such as the examples shown in FIG. 14 and FIG. 15, instead of SUBCARRIERS_LIST, there is a need to indicate what set of LTFs each STA can use to send its ACK/BA frame in the UL MU MIMO format. Each STA that has a payload in the DL MU MIMO frame (e.g., 1500) and intends to place its ACK/BA frame in the MU ACK/BA after the DL MU MIMO frame, can select a unique index denoted by LTF_index (which is not shared by other STAs in the same DL MU frame) and intends to use this index to define the set of HE LTF symbols (e.g., 1422) that the STA can place at the beginning of its MU ACK/BA frame as shown in FIG. 14 and FIG. 15.

In the case of FIG. 15 where the DL MU frame is a DL MU MIMO frame (e.g., 1500), there is a GID indication in HE SIG-A or HE SIG-B (e.g., 1401) where it indicates all the STAs that are part of the GID and may have a payload in the DL PPDU. Additionally, there is an order associated per STA in the GID, and if the NSS associated with this order is non-zero, the GID indicates that the STA has a payload in the DL MU MIMO PPDU. Given the GID, the order of each STA in the GID, and whether the associated NSS in the GID is zero or non-zero, each STA that has a payload in the DL MU MIMO frame can select an index, LTF_index, which is used to define the set of HE LTF symbols (e.g., 1422) that they use.

In some aspects, a HE STA receives a HE DL MU MIMO PPDU (e.g., 1500) that includes a GID associated with the HE STA and a non-zero NSS associated with the same order as the order of the HE STA in the GID. If the transmitter of the HE DL MU MIMO PPDU has indicated in the HE SIG (e.g., 1401) that the MU ACK frame can be in the UL MU MIMO format, then the HE STA creates the set of HE LTF symbols (e.g., 1422) for the MU ACK based on a row index of a P matrix for the LTF symbols where the row index is the same order as the order of the HE STA in the GID of the HE DL MU MIMO PPDU. The row index is the LTF_index and is used to prepare the set of HE LTF symbols that they use.

In the case of FIG. 15 where the DL MU PPDU is a DL OFDMA PPDU (e.g., 1500), each STA that has a payload in the DL MU MIMO frame and intends to place its ACK/BA frame in the MU ACK/BA after the DL MU frame, selects a unique index (which is not shared by other STAs in the same DL MU frame) and uses the selected index to define the set of HE LTF symbols that the STA can place at the beginning of its MU ACK/BA frame as shown in FIG. 15. However, unlike FIG. 14, where there is an explicit index associated with each STA in the GID, there is no such indexing similarly defined in FIG. 15. In some embodiments, an implicit indication may be used to inform each STA of their LTF_index to be used for a MU ACK/BA frame. Such implicit indication works as follows.

In some aspects, a HE STA that receives a HE DL OFDMA PPDU (e.g., 1400), where the AID/PAID or any related ID of the HE STA is indicated in the HE SIG-B field (e.g., 1401) of the HE OFDMA PPDU. If the transmitter of the HE DL OFDMA PPDU has indicated in the HE SIG (e.g., 1401) that the MU ACK frame 1420) can be in the UL MU MIMO format, then the HE STA creates the set of HE LTF symbols for the MU ACK based on a row index of the P matrix for the LTF symbols, where the row index is the order where the sub-band assignment of the HE STA appears in the DL OFDMA PPDU.

In other aspects, a HE STA that receives a HE DL OFDMA PPDU 1400), where the AID/PAID or any related ID of the HE STA is indicated in the HE SIG-B field (e.g., 1401) of the HE OFDMA PPDU. If the transmitter of the HE DL OFDMA PPDU has indicated in the HE SIG (e.g., 1401) that the MU ACK frame (e.g., 1420) can be in the UL MU MIMO format, the HE SIG symbol of the DL OFDMA PPDU may carry a value called LTF row (with size of 3 or 4 bits) for each STA whose sub-band assignment appears in the HE SIG-B. Note that if LTF row is set to a reserved value, then the LTF row reflects that the HE STA may not send an MU ACK/BA frame. In turn, the HE STA creates the set of HE LTF symbols for the MU ACK based on a row index of the P matrix for the LTF symbols where the row index is the same value as the associated LTF row for the HE STA (that appears in the HE SIG symbol of the HE DL OFDMA PPDU).

Once the LTF_index is obtained by a HE STA that intends to participate in forming an MU ACK frame, the HE STA prepares the set of LTF symbols (e.g., 1422) to be used as in FIG. 14 and FIG. 15 as follows. The STA creates a set of HE LTF symbols with possibly 4 μs symbol length (per each LTF symbol) or possibly with 8 μs or 12 μs length depending on implementation. The set of HE LTF symbols are going to be N_LTF symbols, where N_LTF is either the same number as the number of LTF symbols in the previous DL MU MIMO frame, or it is explicitly indicated in the HE SIG symbol of the previous DL MU MIMO frame. In turn, the STA selects the set of LTF symbols from the LTF_index row that are created based on an orthogonal matrix that is denoted by P (Orthogonal P matrix). The Orthogonal P matrix may have many forms. In one embodiment, the P matrix with size four has the following rows: First row of the P matrix is: 1, −1, 1, 1; second row of the P matrix is: 1, 1, −1, 1; third row of the P matrix is: 1, 1, 1, −1; and fourth row of the P matrix is: −1, 1, 1, 1. In another embodiment, the P matrix with size eight has the following rows: First row of the P matrix is: 1, −1, 1, 1, 1, −1, 1, 1; second row of the P matrix is: 1, 1, −1, 1, 1, 1, −1, 1; third row of the P matrix is: 1, 1, 1, −1, 1, 1, 1, −1; fourth row of the P matrix is: −1, 1, 1, 1, −1, 1, 1, 1;

fifth row of the P matrix is: 1, −1, 1, 1, −1, 1, −1, −1; sixth row of the P matrix is: 1, 1, −1, 1, −1, −1, 1, −1; seventh row of the P matrix is: 1, 1, 1, −1, −1, −1, −1, 1; and eighth row of the P matrix is: −1, 1, 1, 1, 1, −1, −1, −1. Once a row of the orthogonal P matrix is selected, a HE STA arranges several HE LTF symbols sequentially but the set of LTF symbols get multiplied by the row of the orthogonal P matrix. This set of LTF symbols appear as "Set of HE LTFs" (e.g., 1422) as in FIG. 14 and FIG. 15. This operation causes that the set of HE LTF symbols created using two different rows of an orthogonal matrix can be orthogonal.

Note that while in FIGS. 7, 14 and 15, the bandwidth of the MU ACK frame is the same as the DL OFDMA frame, in general it is possible that the bandwidth of the MU ACK is narrower than the BW of the DL OFDMA frame. However, it is expected that the AP establishes the understanding of the bandwidth of the MU ACK ahead of time so that all of the STAs know the bandwidth of the MU ACK that they are going to participate in forming. In one instance, the bandwidth of the MU ACK may be fixed to 20 MHz regardless of the bandwidth of the DL OFDMA frame, or the bandwidth of the MU ACK may be fixed to 40 MHz when DL OFDMA PPDUs has a bandwidth of 40 MHz or more. The indication of the bandwidth of the MU ACK frame can be performed in multiple ways: (a) it may be identified as an indication to all STAs either in Beacon frames or during association time, (b) or it may be identified in each DL OFDMA frame within the HE SIG-A or HE SIG-B, the AP notifies the STAs (that are expecting a DL payload from the AP) of the bandwidth for the expected MU ACK frame. Given the bandwidth of the MU ACK frame, the bandwidth of all the sub-bands assigned to an ACK or a BA frame are the same, and the total number of sub-bands for ACK/BA multiplexing is given in some embodiments.

In forming the partial HE PLCP and/or PSDU part of an MU ACK frame, a STA can set the TXVECTOR parameter GI_TYPE of a MU ACK frame carried in the HE PPDU format (with partial PLCP or preamble header as described above) to the RXVECTOR parameter GI_TYPE of a frame eliciting the response. In other embodiments, a STA can set the TXVECTOR parameter GI_TYPE of a MU ACK frame carried in the HE PPM format (with partial PLCP or preamble header as described above) to the LONG_GI (for the FFT size of 256, LONG_GI may have values such as 1.6 µs or 3.2 µs). If a BA frame is sent as an immediate response to either an implicit BA request carried in an HE MU PPDU, the MU ACK frame (that contains the BA frame) can be carried in HE PPDU with the setting as described above. The rate and bandwidth of the BA is selected as described above using CODING, MCS, GI parameters of the RXVECTOR parameters of the HE DL OFDMA PPDU in order to set CODING, MCS, GI parameters of the TXVECTOR parameters of the MU ACK frame. If an ACK frame is sent as an immediate response to either an implicit BA request carried in an HE OFDMA PPDU, the MU ACK frame (that contains the BA frame) can be carried in HE PPDU with the setting as described above. The rate and bandwidth of the BA is selected as described above using CODING, MCS, GI parameters of the RXVECTOR parameters of the HE DL OFDMA PPDU in order to set CODING, MCS, GI parameters of the TXVECTOR parameters of the MU ACK frame.

While receiving an MU ACK frame transmitted in the HE PPDU format with details described above, the AP uses the RXVECTOR parameter LTF_Set_Index to identify which STA has responded with ACK and BA frames. The MAC entity compares the RXVECTOR parameter LTF_Set_Index with the order of the TXVECTOR parameter SUBCARRI-ERS_LIST of the preceding HE OFDMA PPDU sent, and identifies which of the STAs has participated in forming the MU ACK. Specially for ACK frames, the AP does not know which STA has sent the ACK frame since there is no TA field in the received ACK frame (ACK frame only has RA address). However, in some embodiments where the LTF_Set_Index of the TX VECTOR of a HE OFDMA PPDU and the order of SUBCARRIERS_LIST of the TXVECTOR of the immediately following MU ACK are the same for each STA that receives a payload in the HE OFDMA PPDU and that participates in forming the MU ACK frame, the AP can verify the presence of LTF_Set_Index in the RX VECTOR of the received MU ACK frame. If the ACK or BA frame is not present in the given SUBCARRIERS_LIST of the received MU ACK frame, the AP infers the STA that has not sent an ACK or BA frame using the given order of the SUBCARRIERS_LIST (in the DL OFDMA and MU ACK exchange). If a BA or ACK frame is present in the given SUBCARRIERS_LIST of the received MU ACK frame and if the frame is an ACK frame, then the AP can further infer which STA has sent the ACK frame (see FIG. 15).

Referring back to FIG. 13, an AP may use both the QoS control field and the HECE sub-field 1320 in a DL payload to inform the STA, that has a payload in the DL MU frame, on where to locate the sub-band that the STA intends to use to place its ACK or BA frame in the immediately multiplexed-ACK/BA frame. To do so, for each payload in a DL MU frame, an AP uses the HECE sub-field 1320 in the MAC header and fills the designated "LTF Set Index" field. Note that the LTF Set Index field may have additional sub-fields such as "Size of LTF Set," where collectively these sub-fields explicitly identify all the right set of LTF symbols that the STA intends to use to place its ACK/BA frame in the UL multiplexed ACK/BA frame. Yet in other embodiments, the AP may add an Action Management frame to the DL data payload (hence forming an AMPDU) where the management frame identifies the sub-bands that the STA intends to use to place its ACK/BA frame in the UL multiplexed ACK/BA frame. The structure of the HT Control (HTC) field and its possible extension is shown in FIG. 13. When the HECEI field 1311 in the HT Control Middle 1310 is set to 1, then the HECE sub-field exists, otherwise the HECE sub-field does not exist. The HECE sub-field 1320 carries the following information: ACK/BA Sub-bands, LTF Set Index, ULDL, Bandwidth, sub-band resolution, MCS and NSS per all the sub-bands with the mentioned sub-band resolution, queue size per TID, or alternatively queue size per AC. Note that some of above sub-fields are optional or may be skipped since it is also reported in HTC or QoS fields. For instance, in one embodiment, the queue size may only be reported (per an AC or all ACs) in the QoS control field and no indication of queue size is reported in HECE sub-field 1320. However, in another embodiment, it may be beneficial to have the queue size per AC or per TID, hence these values are reported in the HECE sub-field 1320.

Figure 16A:
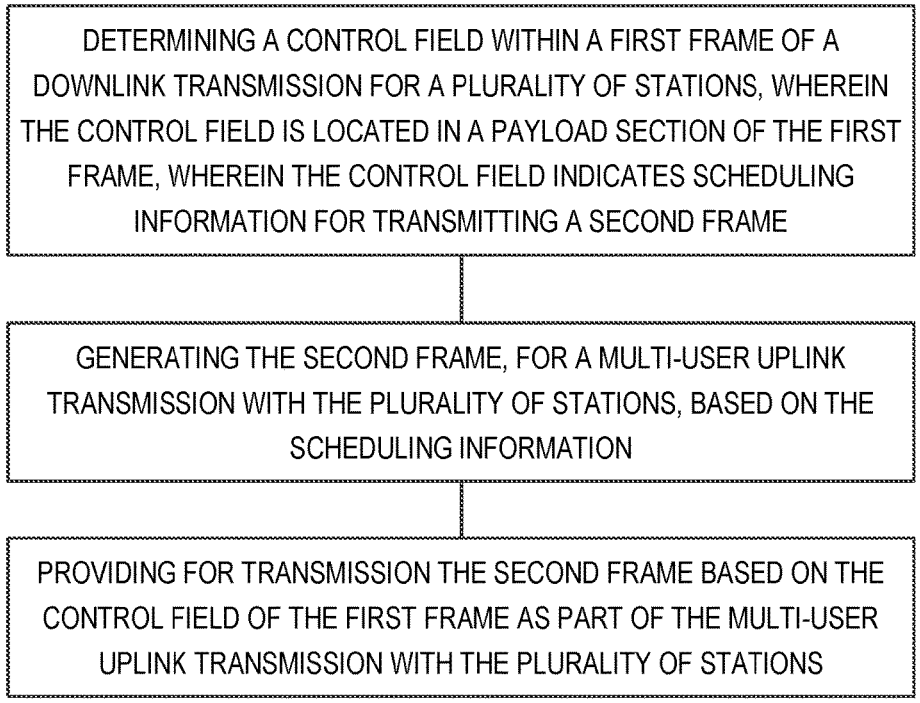
Figure 16B:
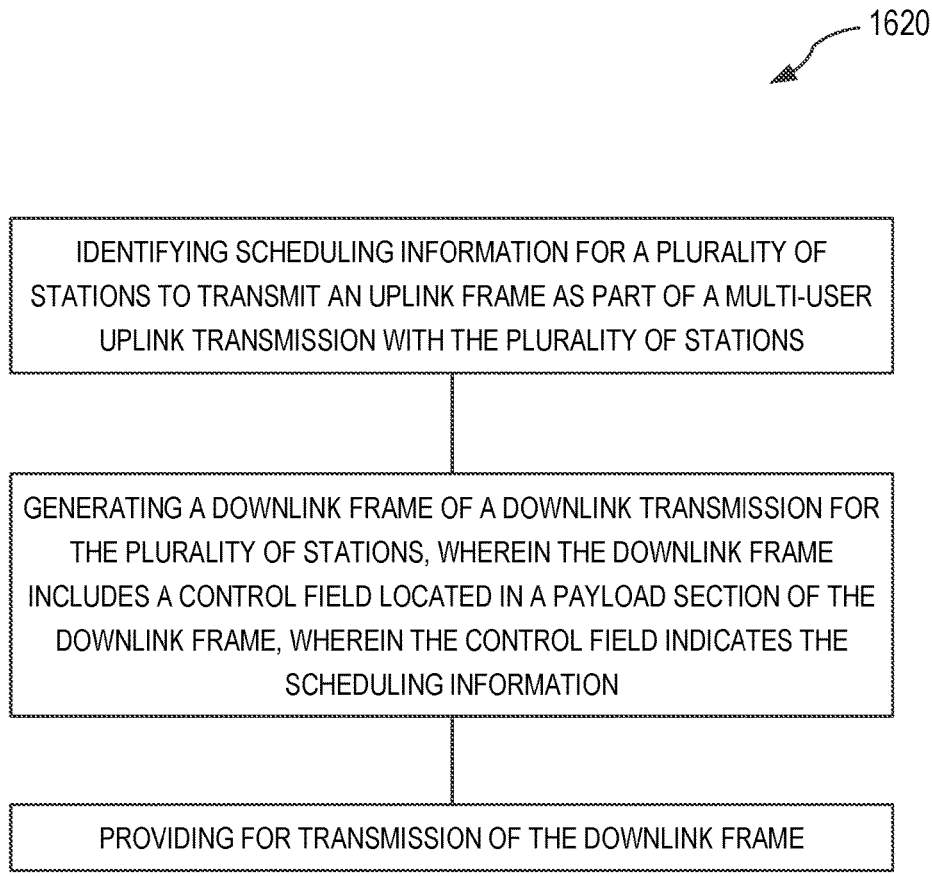

FIGS. 16A-16C illustrate flow charts of examples of multi-user aggregation methods for data and control frames. For explanatory and illustration purposes, the example processes 1610, 1620 and 1630 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1610, 1620 and 1630 are not limited to the wireless communication devices 111-115 of FIG. 1 or their components, and the example processes 1610, 1620 and 1630 may be performed by some of the devices shown in FIG. 1, or other devices or components. Further for explanatory and illustration purposes, the blocks of the example processes 1610, 1620 and 1630 are described herein as occurring in serial or linearly. However, multiple blocks of the example processes 1610, 1620 and 1630 may occur in parallel. In addition, the blocks of the example processes 1610, 1620 and 1630 need not be performed in the order shown and/or one or more of the blocks/actions of the example processes 1610, 1620 and 1630 need not be performed. Various examples of aspects of the disclosure are described below as clauses for convenience. These are provided as examples, and do not limit the subject technology. As an example, some of the clauses described below are illustrated in FIGS. 16A through 16C.

Clause A. A station for facilitating multi-user communication in a wireless network, the station comprising: one or more memories; and one or more processors coupled to the one or more memories, the one or more processors configured to cause: determining a control field within a first frame of a downlink transmission for a plurality of stations, wherein the control field is located in a payload section of the first frame, wherein the control field indicates scheduling information for transmitting a second frame; generating the second frame, for a multi-user uplink transmission with the plurality of stations, based on the scheduling information; and providing for transmission of the second frame based on the control field of the first frame as part of the multi-user uplink transmission with the plurality of stations.

Clause B. A non-transitory computer-readable storage medium storing computer-executable instructions that, when executed by one or more processors, cause one or more processors to perform operations, the operations comprising: identifying scheduling information for a plurality of stations to transmit an uplink frame as part of a multi-user uplink transmission with the plurality of stations; generating a downlink frame of a downlink transmission for the plurality of stations, wherein the downlink frame includes a control field located in a payload section of the downlink frame, wherein the control field indicates the scheduling information; and providing for transmission of the downlink frame.

Clause C. A computer-implemented method of facilitating multi-user communication in a wireless network, the method comprising: generating a multi-user frame for downlink transmission directed to a plurality of stations, wherein the multi-user frame includes a control field located in a payload section of the multi-user frame, wherein the control field indicates scheduling information for each of the plurality of stations to transmit an uplink frame as part of a multi-user uplink transmission with the plurality of stations; and providing for transmission the multi-user frame.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

The embodiments provided herein have been described with reference to a wireless LAN system; however, it can be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, anon-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A. B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It can be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor can they be interpreted in such a way.

What is claimed is:

1. A station for facilitating multi-user communication in a wireless network, the station comprising:
   one or more memories; and
   one or more processors coupled to the one or more memories, the one or more processors configured to cause:
      determining a control field within a first frame of a downlink transmission for a plurality of stations, wherein the control field is located in a media access control (MAC) header of a trigger MAC PDU (MPDU) within a payload section of the first frame;
      determining whether an extension indication field in the control field indicates that the control field includes an extended control field, the extended control field indicating one or more sub-bands assigned to the station, wherein the control field indicates scheduling information for transmitting a second frame when the extension indication field indicates that the control field includes the extended control field;
      generating the second frame, for a multi-user uplink transmission with the plurality of stations, based on the scheduling information; and
      providing for transmission of the second frame using the one or more sub-bands based on the control field of the first frame as part of the multi-user uplink transmission with the plurality of stations.

2. The station of claim 1, wherein the scheduling information includes an assignment of one or more resource units to the station, wherein the station utilizes the one or more assigned resource units for the multi-user uplink transmission with the plurality of stations.

3. The station of claim 2, wherein the second frame includes an acknowledgment (ACK) frame or a block acknowledgment (BA) frame utilizing the one or more assigned resource units.

4. The station of claim 3, wherein the first frame includes a multicast media access control (MAC) protocol data unit (MPDU), addressed to a set of stations, and the scheduling information requests an ACK or BA frame from one or more of the stations in the set of stations addressed by the multicast MPDU.

5. The station of claim 2, wherein the one or more resource units identify one or more sub-bandwidths of a channel bandwidth of the downlink transmission.

6. The station of claim 1, wherein the second frame is a trigger-based physical layer convergence procedure (PLCP) protocol data unit (PPDU) that carries an immediate acknowledgment to the first frame.

7. The station of claim 6, wherein the scheduling information includes a length of the trigger-based PPDU.

8. The station of claim 1, wherein the control field is a High Efficiency Control field within the MAC header of the trigger MPDU.

9. The station of claim 1, wherein the control field is located in a trigger MAC PDU (MPDU) and the trigger MPDU is a first MPDU in an aggregated-MPDU (A-MPDU) within the payload section of the first frame.

10. The station of claim 9, wherein the trigger MPDU is a control frame that carries the control field in a payload of the trigger MPDU.

11. The station of claim 1, wherein each of the downlink transmission and the multi-user uplink transmission are one or more of an orthogonal frequency-division multiple access (OFDMA) transmission or a multi-user multi-input multi-output (MU MIMO) transmission.

12. A non-transitory computer-readable storage medium storing computer-executable instructions that, when executed by one or more processors, cause one or more processors to perform operations, the operations comprising:
    identifying scheduling information for a plurality of stations to transmit an uplink frame as part of a multi-user uplink transmission with the plurality of stations;
    generating a downlink frame of a downlink transmission for the plurality of stations, wherein the downlink frame includes a control field located in a media access control (MAC) header of a trigger MAC PDU (MPDU) within a payload section of the downlink frame, wherein the control field includes an extension indication field that indicates whether the control field includes an extended control field, the extended control field indicating one or more sub-bands assigned to the station, wherein the control field indicates the scheduling information when the extension indication field indicates that the control field includes the extended control field; and
    providing for transmission the downlink frame.

13. The non-transitory computer-readable storage medium of claim 12, wherein the downlink frame includes a multicast MAC protocol data unit (MPDU), addressed to a set of stations, and the scheduling information requests an acknowledgment (ACK) or block ACK (BA) frame from one or more of the stations in the set of stations addressed by the multicast MPDU.

14. The non-transitory computer-readable storage medium of claim 12, wherein the control field is a High Efficiency control field within the MAC header of the trigger MPDU.

15. The non-transitory computer-readable storage medium of claim 12, wherein the control field is located in a trigger MAC protocol data unit (MPDU) and the trigger MPDU is a first MPDU in an aggregated-MPDU (A-MPDU) within the payload section of the downlink frame.

16. The non-transitory computer-readable storage medium of claim 15, wherein the trigger MPDU is a control frame that carries the control field in a payload of the trigger MPDU.

17. The non-transitory computer-readable storage medium of claim 12, wherein the uplink frame is a trigger-based physical layer convergence procedure (PLCP) protocol data unit (PPDU) that carries an immediate acknowledgment to the downlink frame.

18. A computer-implemented method of facilitating multi-user communication in a wireless network, the method comprising:
    generating a multi-user frame for downlink transmission directed to a plurality of stations, wherein the multi-user frame includes a control field located in a media access control (MAC) header of a trigger MAC PDU (MPDU) within a payload section of the multi-user frame, wherein the control field includes an extension indication field that indicates whether the control field includes an extended control field, the extended control field indicating one or more sub-bands assigned to the station, wherein the control field indicates scheduling information for each of the plurality of stations to transmit an uplink frame as part of a multi-user uplink transmission with the plurality of stations when the extension indication field indicates that the control field includes the extended control field; and
    providing for transmission the multi-user frame.

\* \* \* \* \*